US008393567B2

(12) United States Patent
Moore et al.

(10) Patent No.: US 8,393,567 B2
(45) Date of Patent: Mar. 12, 2013

(54) METHOD AND APPARATUS FOR REDUCING AIRCRAFT NOISE

(75) Inventors: Matthew D. Moore, Everett, WA (US); Kelly L. Boren, Marysville, WA (US); Justin Lan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 12/946,341

(22) Filed: Nov. 15, 2010

(65) Prior Publication Data

US 2012/0119023 A1 May 17, 2012

(51) Int. Cl.
*B64D 27/00* (2006.01)
(52) U.S. Cl. ............................................ 244/55; 244/54
(58) Field of Classification Search ...................... 29/428
See application file for complete search history.

(56) References Cited

U.S. PATENT DOCUMENTS

| 7,484,589 | B2 | 2/2009 | Guo | |
|---|---|---|---|---|
| D622,653 | S * | 8/2010 | Moore et al. | D12/319 |
| 7,900,865 | B2 * | 3/2011 | Moore et al. | 244/1 N |
| 7,900,868 | B2 * | 3/2011 | Sankrithi et al. | 244/10 |
| 8,016,233 | B2 * | 9/2011 | Moore et al. | 244/119 |
| 8,087,607 | B2 * | 1/2012 | Moore et al. | 244/1 N |
| 2007/0176047 | A1 * | 8/2007 | Moore et al. | 244/54 |
| 2008/0142641 | A1 * | 6/2008 | Moore et al. | 244/215 |
| 2008/0258005 | A1 * | 10/2008 | Gall et al. | 244/55 |
| 2010/0206982 | A1 * | 8/2010 | Moore et al. | 244/62 |
| 2011/0089290 | A1 * | 4/2011 | Moore et al. | 244/1 N |
| 2011/0150645 | A1 * | 6/2011 | Moore et al. | 416/1 |
| 2012/0091270 | A1 * | 4/2012 | Moore et al. | 244/1 N |

FOREIGN PATENT DOCUMENTS

WO   WO2007051914   5/2007

OTHER PUBLICATIONS

Michael J. Czech et al., "Propulsion Airframe Aeroacoustic Integration Effects for a Hybrid Wing Body Aircraft Configuration", 16th AIAA/CEAS Aeroacoustics Conference, AAIA 2010-3912, 2010, pp. 1-23, American Institute of Aeronautics and Astronautics, Inc.
Dimitri Papamoschou et al., "Experiments on Shielding of Jet Noise by Airframe Surfaces", 15th AIAA/CEAS Aeroacoustics Conference (30th AIAA Aeroacoustics Conference), May 11-13, 2009, Miami, Florida, AIAA 2009-3326, 2009, pp. 1-16, American Institute of Aeronautics and Astronautics, Inc.
R.L.M. Wong et al., "Shielding Concepts for Jet Noise", AIAA 7th Aeroacoustics Conference, Oct. 5-7, 1981, Palo Alto, California, AIAA-81-2020, 1981, pp. 1-12, American Institute of Aeronautics and Astronautics, Inc.
R.W. Jeffery et al., "An Experimental Investigation of Noise-Shielding Effects for a Delta-Winged Aircraft in Flight, Wind Tunnel and Anechoic Room", AIAA 2nd Aero-Acoustics Conference, Hampton, VA, Mar. 24-26, 1975, AIAA-75-513, 1975, pp. 1-10, American Institute of Aeronautics and Astronautics, Inc.
V.M. Conticelli et al., "Noise Shielding Effects for Engine-Over-Wing Installations", AIAA 2nd Aero-Acoustics Conference, Hampton, VA, Mar. 24-26, 1975, AIAA-75-474, 1975, pp. 1-15, American Institute of Aeronautics and Astronautics, Inc.

\* cited by examiner

*Primary Examiner* — Christopher P Ellis
*Assistant Examiner* — Medhat Badawi
(74) *Attorney, Agent, or Firm* — Novatech IP Law

(57) ABSTRACT

An arrangement for an aircraft includes a fuselage, a wing, and a propulsor. The wing may have a wing upper surface, a rear spar and a wing trailing edge. The propulsor may include at least one rotor having a rotor diameter and a rotor axis. The propulsor may be mounted such that the rotor is located longitudinally between the rear spar and the wing trailing edge. The propulsor may also be mounted such that a lowest point of the rotor diameter is located vertically above the wing upper surface.

21 Claims, 15 Drawing Sheets

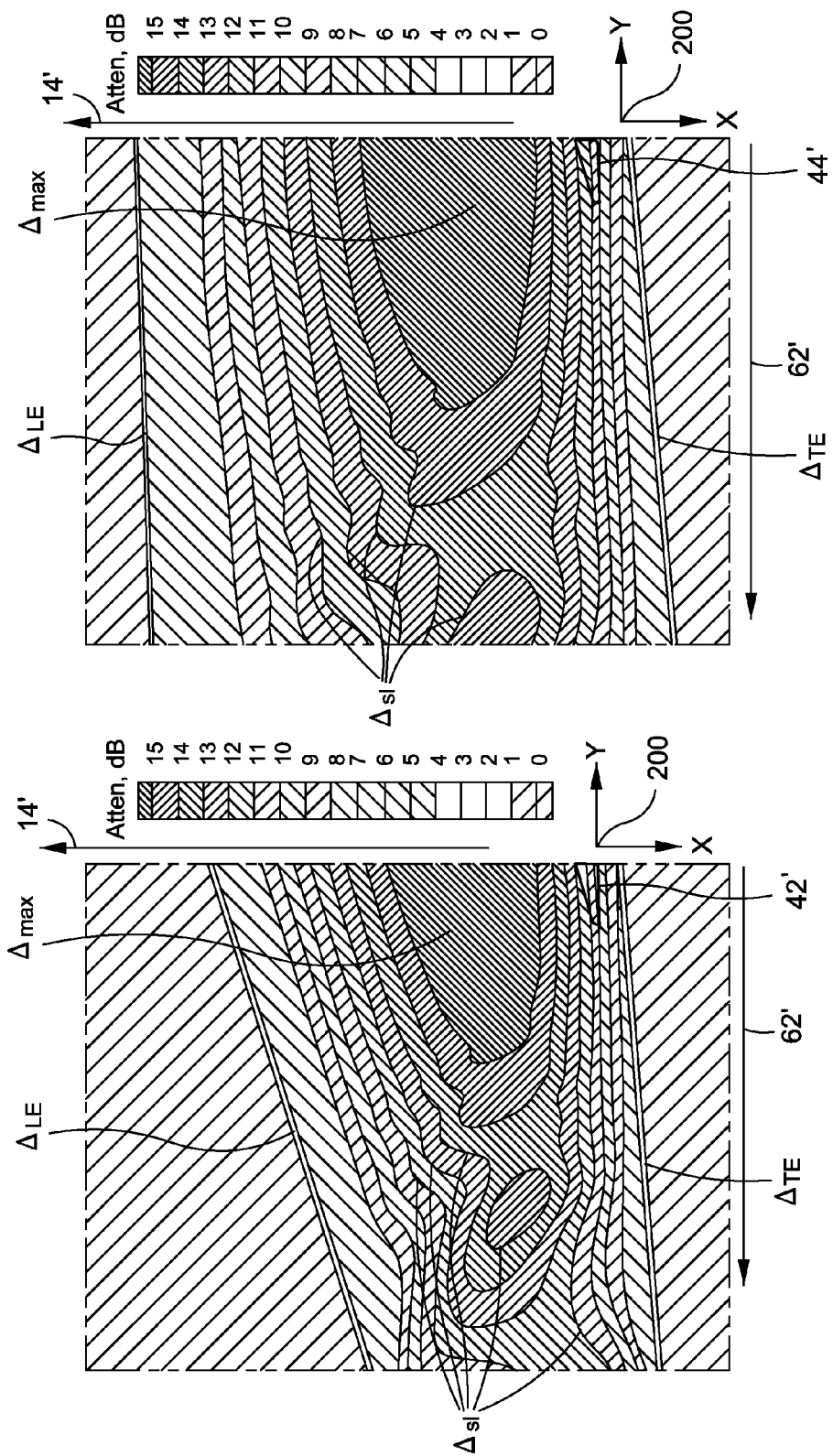

METHOD AND APPARATUS FOR REDUCING AIRCRAFT NOISE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to aircraft configurations and, more particularly, to an arrangement for positioning the engines of an aircraft in a manner for reduction of aircraft noise.

BACKGROUND

Rising fuel costs and increasingly stringent environmental regulations such as carbon taxes are driving the development of aircraft propulsion systems with improved fuel efficiency and reduced carbon consumption. One propulsion system or propulsor configuration which is known to provide improved fuel efficiency is the open fan propulsor. The open fan propulsor may be configured similar to a ducted turbofan engine commonly used in commercial aircraft with the exception that an open fan propulsor may include counter-rotating rotors located forward of or on an exterior of the engine nacelle in contrast to a ducted turbofan engine which includes one or more fans located in the interior of the engine nacelle.

One drawback associated with open fan propulsors is their high noise output. Studies have shown that open fan propulsors produce unacceptably high levels of noise that would undesirably impact communities near airports. In addition, the high noise levels of open fan propulsors may impact communities located under the flight path of the aircraft during climb out of the aircraft. Furthermore, aircraft having open fan propulsors are subject to increasingly strict noise requirements imposed by governing bodies such as the Federal Aviation Administration (FAA) and the International Civil Aviation Organization (ICAO). For example, the FAA administers a noise certification regulation that is harmonized with ICAO and which sets limits on the amount of noise that an aircraft may produce during takeoff and landing.

For noise certification, the FAA requires the measurement of takeoff noise and landing noise to verify that such noise is below defined limits. Takeoff noise includes sideline noise and flyover noise. Sideline noise is measured at a set lateral distance from the runway centerline during takeoff of the aircraft. Flyover noise is measured at a set distance from a downstream end of the runway under the flight path as the aircraft flies over the measurement location. For landing, the FAA requires the measurement of approach noise which is measured from a position underneath the aircraft glide slope as the aircraft approaches the runway threshold. However, approach noise is generally, but not exclusively, the result of the influence of air flowing over and around the airframe components such as the landing gear and wing flaps. Engine noise contributes a comparable portion to the cumulative approach noise of an aircraft due to the relatively low power settings of the aircraft engines during approach.

In efforts to reduce sideline and flyover noise, studies have been undertaken to identify engine-level noise-reducing technologies that could be applied to open fan propulsors. The identified engine technologies were primarily directed toward the propulsor configuration and arrangement of the counter-rotating forward and aft rotors of the open fan propulsor. For example, one of the noise-reducing technologies proposes increased spacing between the forward and aft rotors. Other noise-reducing technologies include blade-cropping to reduce the overall diameter of one of the rotor blades discs, and altering the blade shape and configuration to mitigate rotor-borne blade noise. Unfortunately, each one of the noise-reducing technologies also results in a decrease in thrust and fuel efficiency of the open fan propulsor.

As can be seen, there exists a need in the art for an aircraft arrangement for reducing the noise produced by an open fan aircraft while maintaining the fuel efficiency benefits provided by an open fan propulsor. Ideally, the reduction in noise is achieved without introducing non-aerodynamic surfaces on the aircraft and without increasing the size or quantity of existing aerodynamic surfaces for noise blockage purposes.

SUMMARY

The above-noted needs associated with an open fan propulsor are addressed and alleviated by the present disclosure which, in an embodiment, provides an arrangement for an aircraft comprising a fuselage, a wing and at least one propulsor. The wing has components including a wing upper surface, a rear spar and a wing trailing edge. The propulsor includes at least one open fan comprising one or more rotors and defining a rotor diameter and a rotor axis about which the blades rotate. The propulsor may preferably be mounted such that the one or more rotors are located longitudinally between the rear spar and the wing trailing edge measured along a wing chord line defined by a vertical plane coincident with the rotor axis. The rotor may be located vertically such that a lowest point of the rotor diameter is above the wing upper surface.

In a further embodiment, disclosed is an arrangement for acoustic shielding of an open fan aircraft comprising a generally tubular fuselage and a wing having a wing tip, a wing upper surface, a rear spar and a wing trailing edge. The arrangement includes a propulsor having counter-rotating forward and aft rotors defining a rotor diameter and a rotor axis and including a plurality of rotor blades each having a blade pitch axis about which the blade may pivot. The blade pitch axes of the forward and aft rotors may define a mid-point therebetween. The propulsor may be mounted such that the rotor is located longitudinally such that the mid-point is between the rear spar and the wing trailing edge measured along a wing chord line defined by a vertical plane coincident with the rotor axis. In addition, the rotor may be located longitudinally such that the mid-point is between a forward-most point and an aftmost point of the wing tip when the wing is deflected upwardly under a wing loading of approximately 1-g. The rotor may be located vertically such that a lowest point of the rotor diameter is vertically above the wing upper surface.

Also disclosed is a method of attenuating noise produced by a propulsor of an aircraft. The propulsor may include at least one open fan having a rotor diameter and a rotor axis. The aircraft may include a wing having a wing upper surface, a rear spar and a wing trailing edge. The method may comprise the step of locating the rotor longitudinally between the rear spar and the wing trailing edge measured along a wing chord line defined by a vertical plane coincident with the rotor axis. The method may additionally include locating the rotor vertically such that a lowest point of the rotor diameter is above the wing upper surface.

In a further embodiment, disclosed is a method of attenuating noise produced by a propulsor of an aircraft wherein the propulsor includes counter-rotating forward and aft rotors defining a rotor diameter and a rotor axis. The forward and aft rotors may include a plurality of rotor blades each having a blade pitch axis. The blade pitch axes of the forward and aft rotors may define a mid-point therebetween. The aircraft may include a wing having a wing tip, a rear spar and a wing trailing edge. The method may comprise the step of mounting the propulsor such that the mid-point is longitudinally between the rear spar and the wing trailing edge measured along a wing chord line defined by a vertical plane coincident with the rotor axis. The method may additionally include the step of locating the mid-point longitudinally between a forwardmost point and an aftmost point of the wing tip when the wing is deflected upwardly under a wing loading of approximately 1-g. The lowest point of the rotor diameter may be vertically located above the wing upper surface. The method may additionally include locating the forward and aft rotors vertically such that a highest point of the rotor diameter is below the wing tip when the wing is deflected upwardly under the approximate 1-g wing loading.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 13 is a plot of sound level attenuation contours relative to the aircraft with the open fan propulsors mounted as illustrated in FIGS. 1-5 and the wing in the undeflected shape similar that which is illustrated in FIG. 2;

FIG. 14 is a plot of sound level attenuation contours relative to the aircraft with the wing in the deflected shape similar that which is illustrated in FIG. 2;

DETAILED DESCRIPTION

Figure 1:
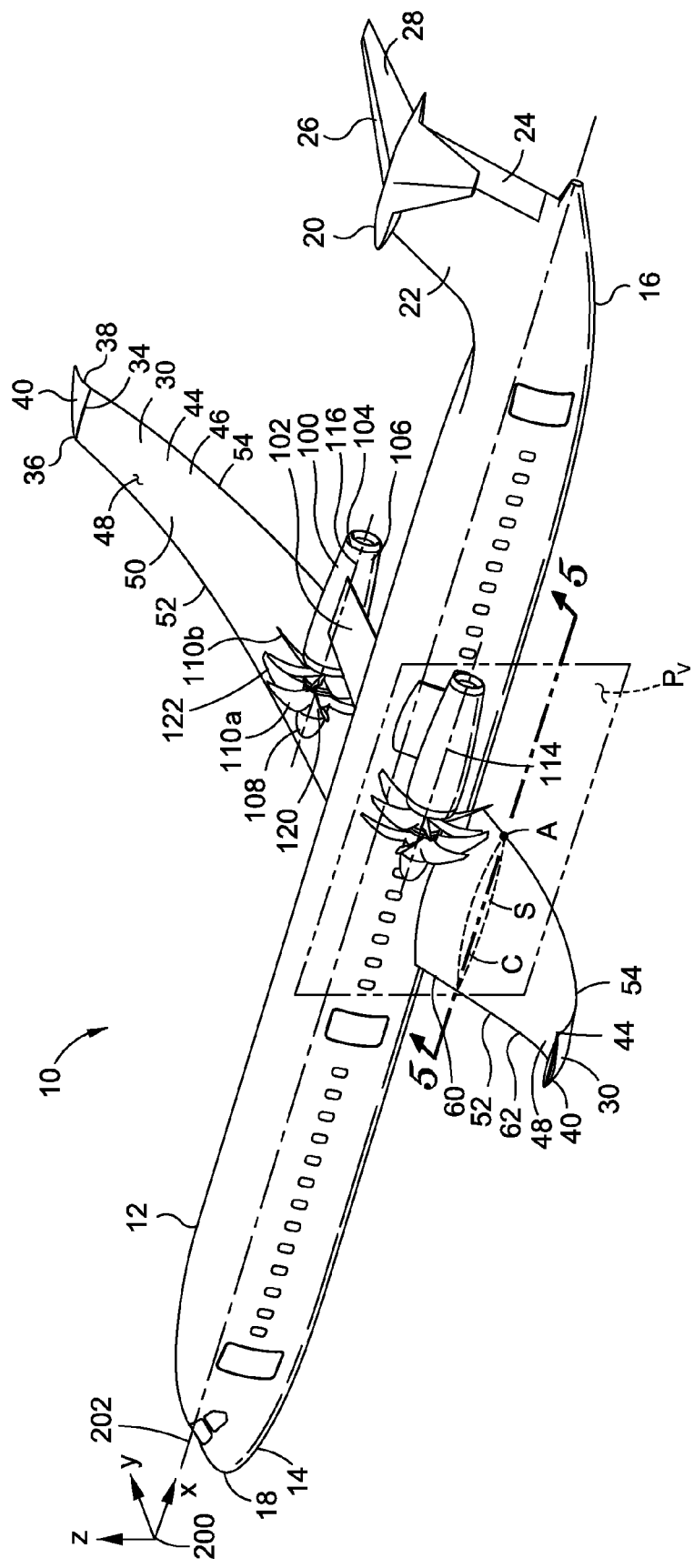
FIG. 1 is an aft perspective illustration of an embodiment of the aircraft having a pair of open fan propulsors mounted in a manner such that at least one of the rotors of each one of the propulsors is located generally above a wing and/or adjacent to a trailing edge thereof.

Referring now to the drawings wherein the showings are for purposes of illustrating preferred and various embodiments of the disclosure, shown in FIG. 1 is an aft perspective illustration of an aircraft 10 having a pair of propulsors 100 configured in an open fan arrangement 116. The propulsors 100 may be positioned relative to the aircraft 10 fuselage 12 and wings 30 in a manner to take advantage of the natural flex of the aircraft 10 wings 30 under an approximate 1-g wing loading 46 and causing the wings 30 to deflect and curve upwardly. The approximate 1-g wing loading 46 may initiate during takeoff and may generally continue during the remainder of the flight. It should be noted that the wing loading may generally vary during the flight. For example, during takeoff, the wing loading may be dependent upon rate of climb and other factors.

The flex of the wings 30 and the extent of upward curvature of the wings 30 may be dependent upon the total mass that is supported by the wings 30, the stiffness characteristics of the wings 30, and other factors. However, in general, the approximate 1-g wing loading 46 may result in a deflected configuration of the wings 30 that, optionally in combination with wing dihedral angle Γ as described below, advantageously provides an acoustic shield against noise generated by the propulsors 100. In this regard, the wings 30 may provide reflective acoustic shielding of propulsor noise in a lateral direction as described in greater detail below. Furthermore, the wings 30 may provide reflective acoustic shielding of propulsor noise in a generally upward or vertical direction and in other directions as described below.

Figure 2:
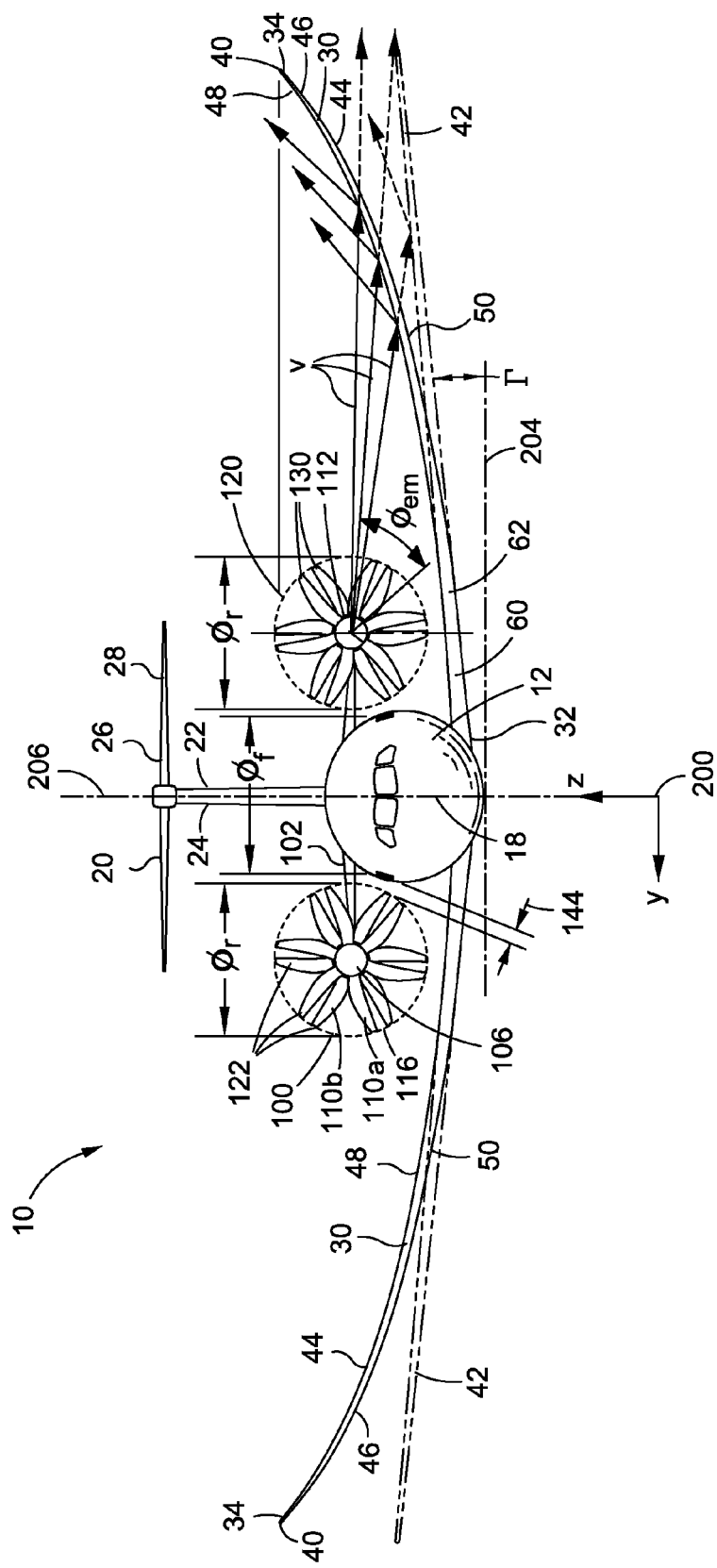
FIG. 2 is a front view of the aircraft illustrating laterally outwardly extending vectors representing acoustic emissions of the open fan propulsors and further illustrating the reflection of the acoustic emissions against the deflected wing under an approximate 1-g wing loading and the non-reflection of the acoustic emissions for the undeflected wing.

As best seen in FIG. 2, the upward curvature of the deflected wings 44 may be due in part to the material properties and construction of the wings 30. For example, the wings 30 may be constructed at least partially of composite materials such as fiber-reinforced materials including, but not limited to, carbon fiber-reinforced polymeric material. The composite construction of the wings 30 may facilitate a relatively large degree of flex and upward curvature of the wings 30 under load as compared to the degree of flex provided by wings of conventional (e.g., metallic) construction. FIG. 2 illustrates the curvature of the deflected wing 44 under an approximate 1-g wing loading 46 relative to the undeflected wing 42 illustrated in phantom below the deflected wing 44. In the present disclosure, the approximate 1-g wing loading 46 may comprise the load resulting from aerodynamic lift forces generated by the aircraft 10 wings 30 in supporting the mass of the loaded aircraft 10 during takeoff and during remaining portions of the flight as mentioned above. In this regard, the approximate 1-g wing loading 46 as disclosed herein may exclude loads imposed on the wings 30 such as gust loads, maneuver loads and other loads to which the wings 30 may be subjected.

Referring to FIG. 1, the aircraft 10 is illustrated as a commercial transport aircraft 10. In this regard, it should be noted that the propulsor 100 arrangement as disclosed herein may be applied to any aircraft 10, without limitation, and is not limited to commercial aircraft 10 of the type illustrated in the Figures. As shown in FIG. 1, the aircraft 10 may have a generally elliptical, cylindrical or tubular fuselage 12 having a nose 18 at a forward end 14 of the aircraft 10 and an empennage 20 at an aft end 16. The empennage 20 may include conventional aerodynamic surfaces including, but not limited to, a vertical stabilizer 22 and rudder 24 for yaw control and a horizontal stabilizer 26 and elevator 28 for pitch control. Although illustrated in a T-tail configuration, the empennage 20 may be provided in any arrangement such as in a V-tail configuration or a conventional tail configuration wherein the horizontal stabilizer 26 and/or elevator 28 are mounted adjacent to the fuselage 12 at a lower portion of the vertical stabilizer 22 and/or rudder 24.

Referring still to FIG. 1, the aircraft 10 may include the pair of wings 30 extending laterally outwardly from opposing sides of the fuselage 12. The aircraft 10 may be provided in a low wing arrangement wherein the wings 30 may be joined to the fuselage 12 at a lower portion of the fuselage 12 to facilitate mounting the propulsors 100 generally above and/or aft of the wings 30 as described in greater detail below. Each one of the wings 30 may have a wing upper surface 48, a wing lower surface 50, a wing leading edge 52 and a wing trailing edge 54. The wing leading edge 52 and wing trailing edge 54 may be provided with a suitable sweep angle $\theta_{LE}$, $\theta_{TE}$ for aerodynamic stability and control purposes and for acoustic shielding purposes as described below. For example, the wing trailing edge 54 may have a sweep angle $\theta_{TE}$ in the range from approximately 0° to −15° and, more preferably, a sweep angle $\theta_{TE}$ in the range of from approximately −5° to −10°. However, the wing trailing edge 54 be provided with any suitable sweep angle $\theta_{TE}$. In this regard, the wing 30 sweep angle $\theta_{LE}$, $\theta_{TE}$ may be optimized in relation to the longitudinal location of the propulsors 100 to maximize acoustic shielding of propulsor noise as described in greater detail below.

Figure 4:
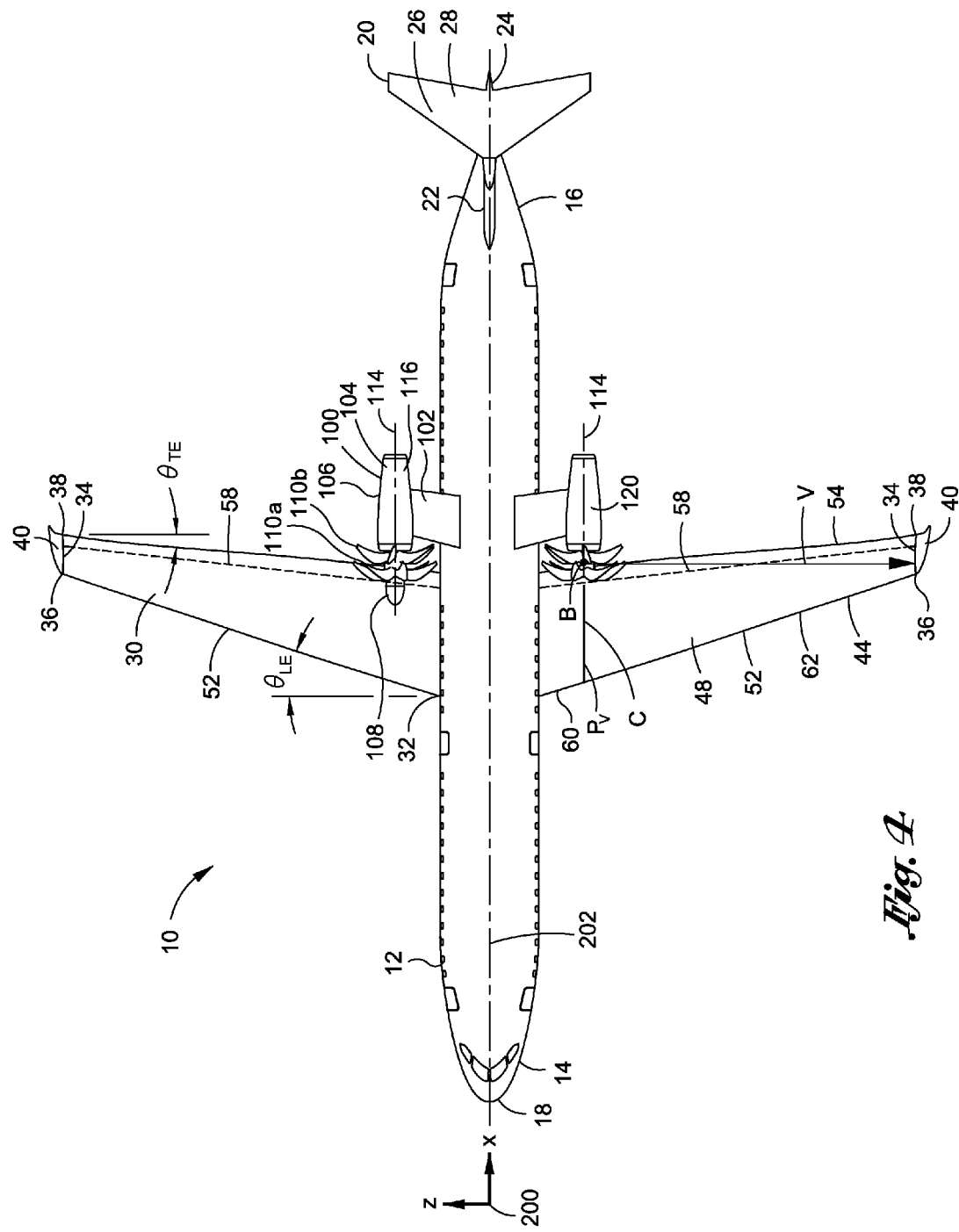
FIG. 4 is a top view of the aircraft illustrating the location of forward and aft rotors of each propulsor generally aft of a wing rear spar and further illustrating the acoustic emission angle vectors intersecting the outboard section of the wing in an embodiment of the aircraft.

Each one of the wings 30 may include an inboard 60 section which may be defined as that portion of the wing 30 extending between the fuselage 12 and a lateral position on the wing 30 defined by the lateral location of the rotor axis 114 of the propulsor 100 as best seen in FIG. 4. The outboard 62 section of the wing 30 may extend between the lateral location of the rotor axis 114 and the wing tip 34. As can be seen in FIG. 1, each one of the wing tips 34 may optionally include a wing tip device 40 or wing tip treatment. For example, FIG. 1 illustrates the wing tip devices 40 as raked tips mounted to the wing tip 34 of each one of the wings 30. However, the wing tip devices 40 may be provided in any configuration, without limitation, including a non-planar winglet configuration which may extend generally vertically upwardly from the wing tip 34. The wing tip devices 40 may also be omitted from the wings 30.

Referring still to FIG. 1, each one of the propulsors 100 is illustrated as being mounted to the aircraft 10 by means of a pylori 102 extending outwardly from the fuselage 12. The pylori 102 is illustrated as extending generally laterally outwardly from an upper portion of the fuselage 12 as best seen in FIG. 2. In addition, FIG. 2 illustrates each one of the pylons 102 as being canted slightly downwardly toward the propulsors 100 from the upper portion of the fuselage 12. Furthermore, the pylons may be provided with forward or aft sweep. However, the pylons 102 may be provided in any orientation and configuration suitable for mounting the propulsors 100 and are not limited to the single pylori 102 extending from the fuselage 12 as illustrated in FIGS. 1-4. For example, the propulsors 100 may be mounted by a plurality of struts (not shown) which may extend from any location of the fuselage 12. Even further, it is contemplated that the propulsors 100 may be supported on the wings 30 by means of one or more pylons 102 or struts (not shown) extending upwardly and aftwardly from the wing 30.

It should also be noted that the pylons 102 may preferably be provided in a non-aerodynamic configuration and/or with a relatively thin cross-sectional shape to minimize aerodynamic drag and eliminate the need for relatively large pylori-to-fuselage fairings (not shown) which may undesirably increase aerodynamic drag. More preferably, the pylons 102 of the aircraft 10 arrangements disclosed here are provided with a relatively thin cross-sectional shape and/or having a non-lift generating configuration that may be integrated into the fuselage 12 with relatively small radius fillets (not shown) at the intersection of the pylori 102 and fuselage 12 to minimize aerodynamic drag. However, it is recognized that the pylons 102 may be provided in any suitable arrangement including an arrangement that provides aerodynamic benefits.

Figure 9:
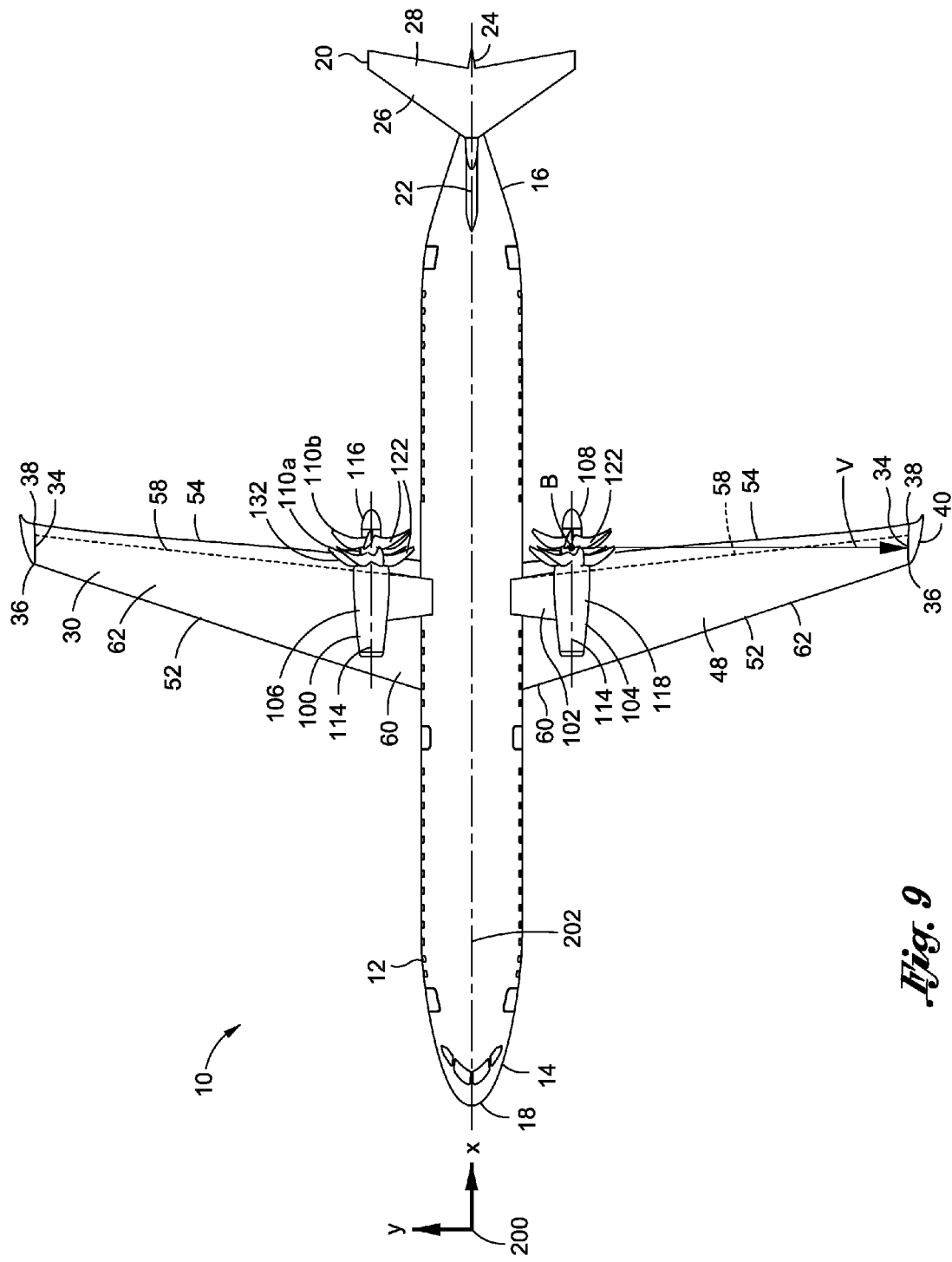
FIG. 9 is a top view illustration of the aircraft illustrating the propulsors in a pusher configuration.
Figure 10:
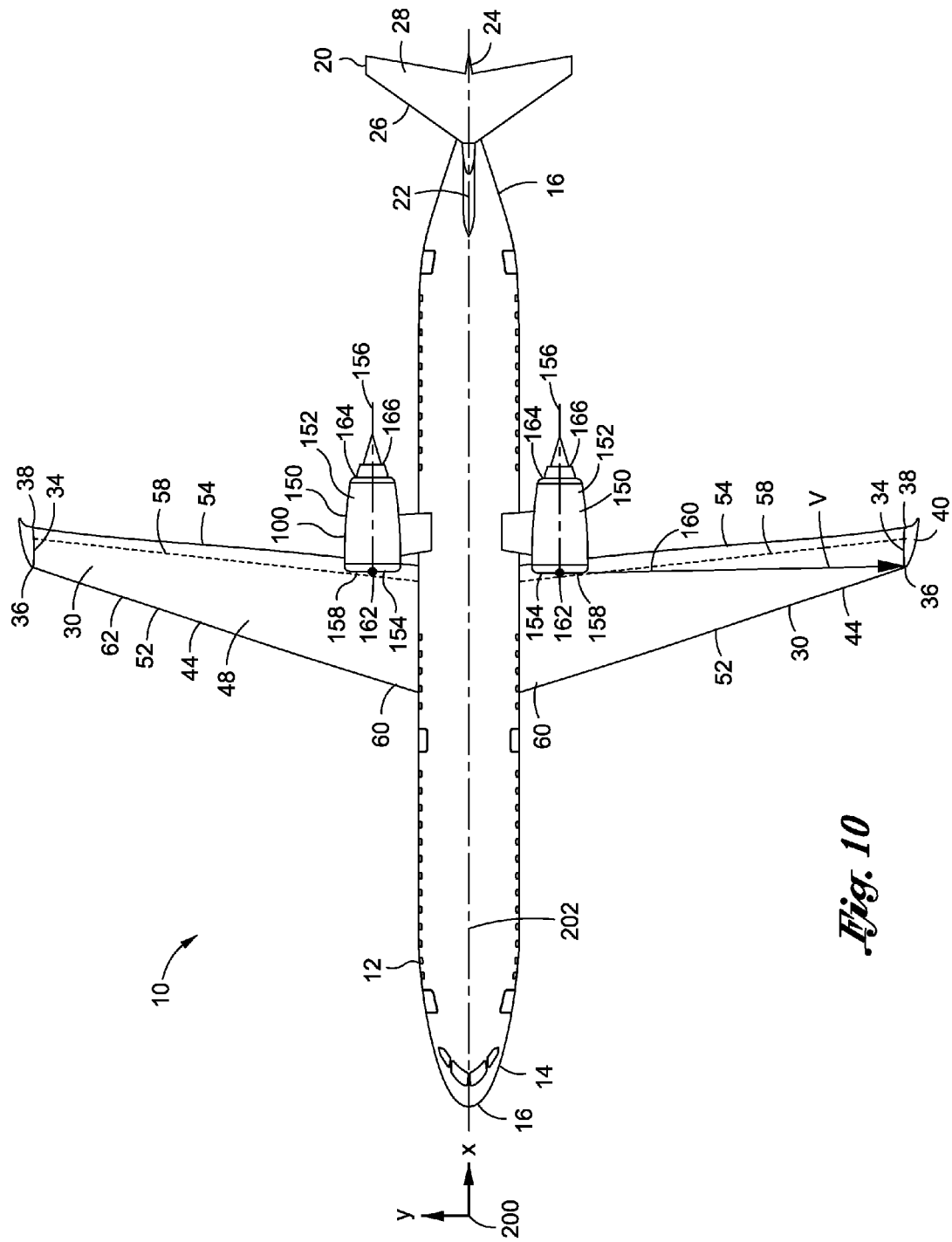
FIG. 10 is a top view illustration of the aircraft illustrating the propulsors in a turbofan configuration.
Figure 11:
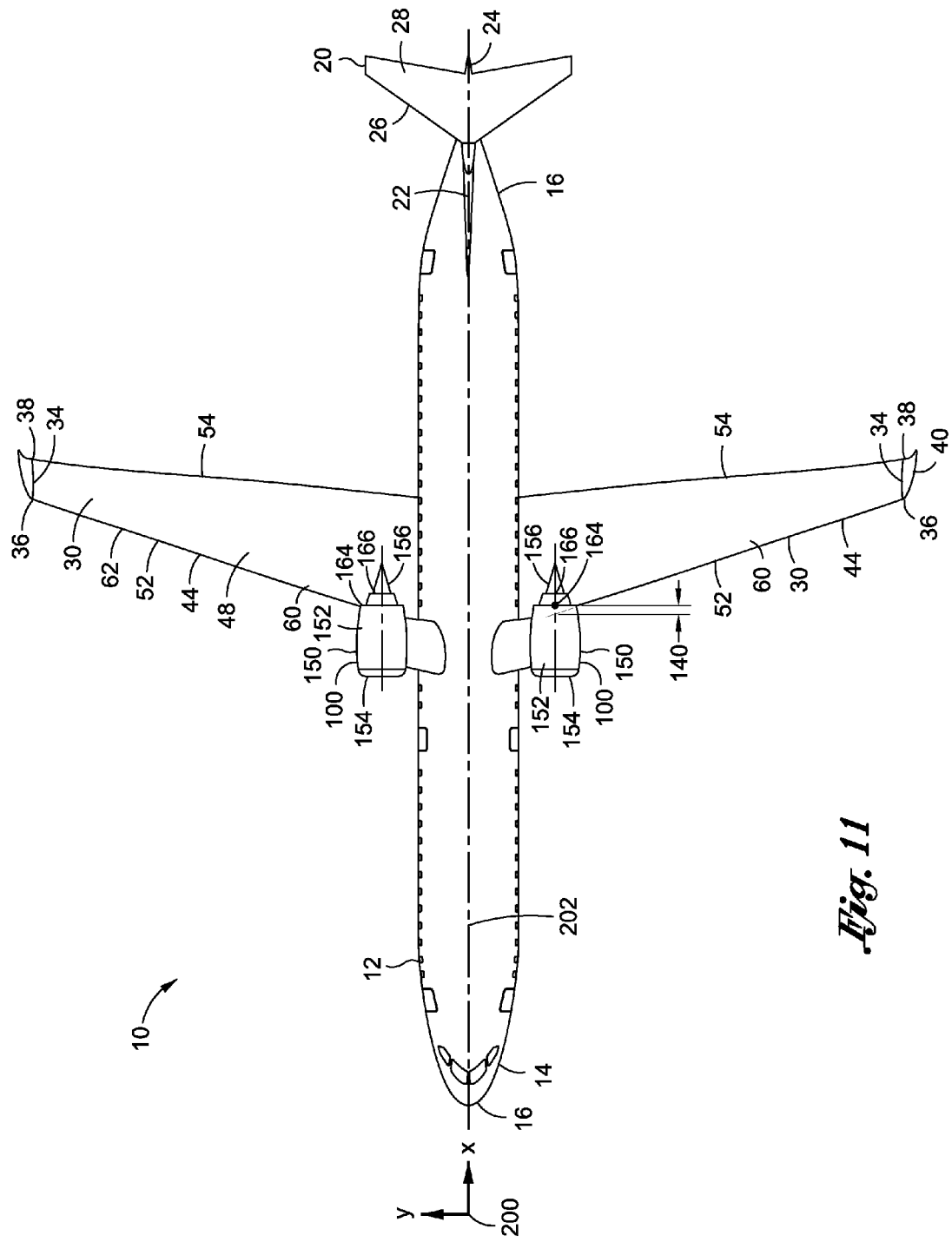
FIG. 11 is a top view illustration of the aircraft illustrating the turbofans mounted such that a secondary flow exit of the turbofan nacelle is longitudinally no further forward than the wing leading edge.
Figure 12:
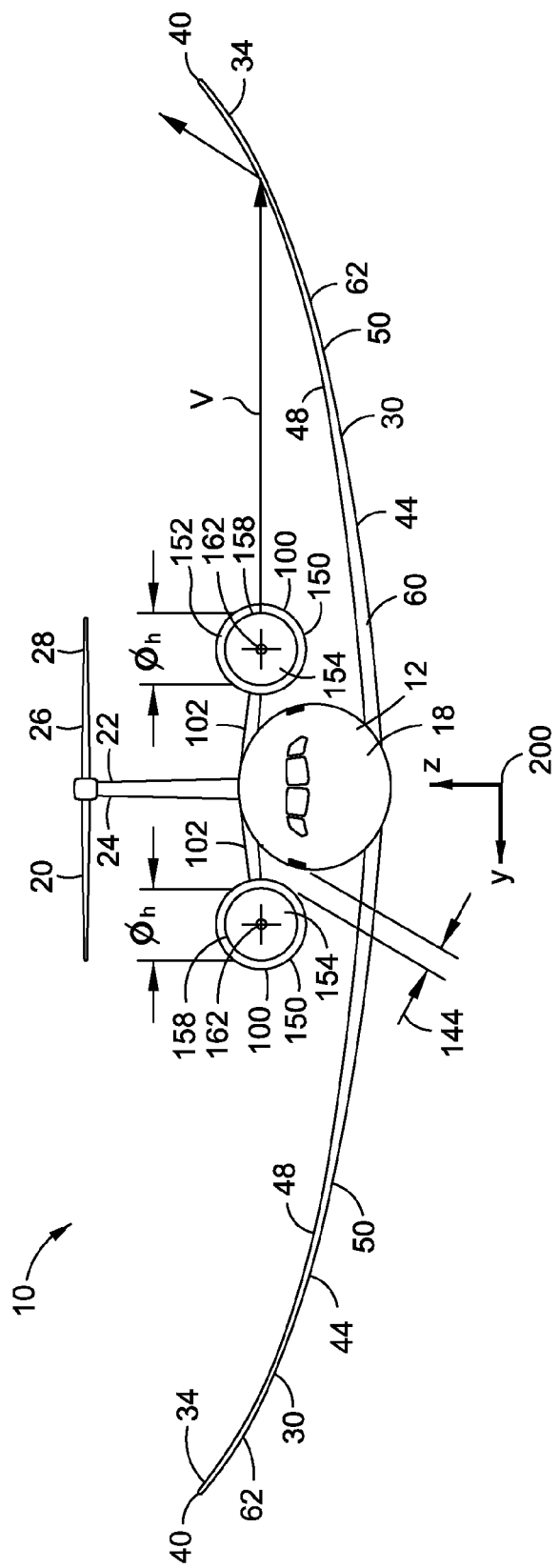
FIG. 12 is a front view illustration of the aircraft illustrating the vertical location of the turbofans in an embodiment of the aircraft.

Referring to FIG. 1, the propulsors 100 are illustrated in an open fan arrangement 116. For example, FIG. 1 illustrates each propulsor 100 as comprising a pair of counter-rotating and coaxially aligned forward and aft rotors 110a, 110b each having a plurality of blades 122 rotatable about a rotor axis 114 (FIG. 4). Furthermore, FIG. 1 illustrates the propulsor 100 in a tractor arrangement 120 wherein the forward and aft rotors 110a, 110b are located forward of an engine core 106 housed within a core case 104. Alternatively, the propulsor 100 may be configured in a pusher arrangement 118 as illustrated in FIG. 9 wherein the forward and aft rotors 110a, 110b are located aft of the engine core 106 as described in greater detail below. Even further, the propulsor 100 may be configured in a turbofan 150 arrangement as illustrated in FIGS. 10-12 and described below.

Referring to FIG. 2, shown is a front view of the aircraft 10 illustrating the propulsors 100 having a rotor diameter $\varnothing_r$ defined as the largest diameter of the forward and aft rotors 110a, 110b and measured at the outermost point of the blade tips 130 during rotation of the blades 122. Although FIGS. 2-9 illustrate propulsors 100 having forward and aft rotors 110 that are of equivalent rotor diameter $ø_r$, the present disclosure contemplates propulsors 100 having a single (not shown) rotor. The forward and aft rotors 110a, 110b may have unequal rotor diameters $ø_r$. In this regard, it should further be noted that in the present disclosure, for a multi-rotor propulsor 100 having rotors 110 of unequal diameter $ø_r$, references to the rotor diameter $ø_r$ are with regard to the largest rotor diameter $ø_r$.

Referring briefly to FIGS. 1-5, the positioning of the propulsors 100 of the aircraft 10 is described below with regard to the wing 30 and the fuselage 12 relative to the aircraft coordinate system 200 illustrated in the Figures. In this regard, the aircraft coordinate system 200 is illustrated in FIG. 1 as a Cartesian coordinate system wherein x is directed aftwardly along a direction of the longitudinal axis 202 extending between the forward end 14 and the aft end 16 of the aircraft 10. The y-axis is directed laterally to the left along a direction of the lateral axis 204 when looking aftwardly from the forward end 14 of the aircraft 10 as shown in FIG. 2. The z-axis is directed upwardly along a direction of the vertical axis 206 as best seen in FIG. 2.

Figure 5:
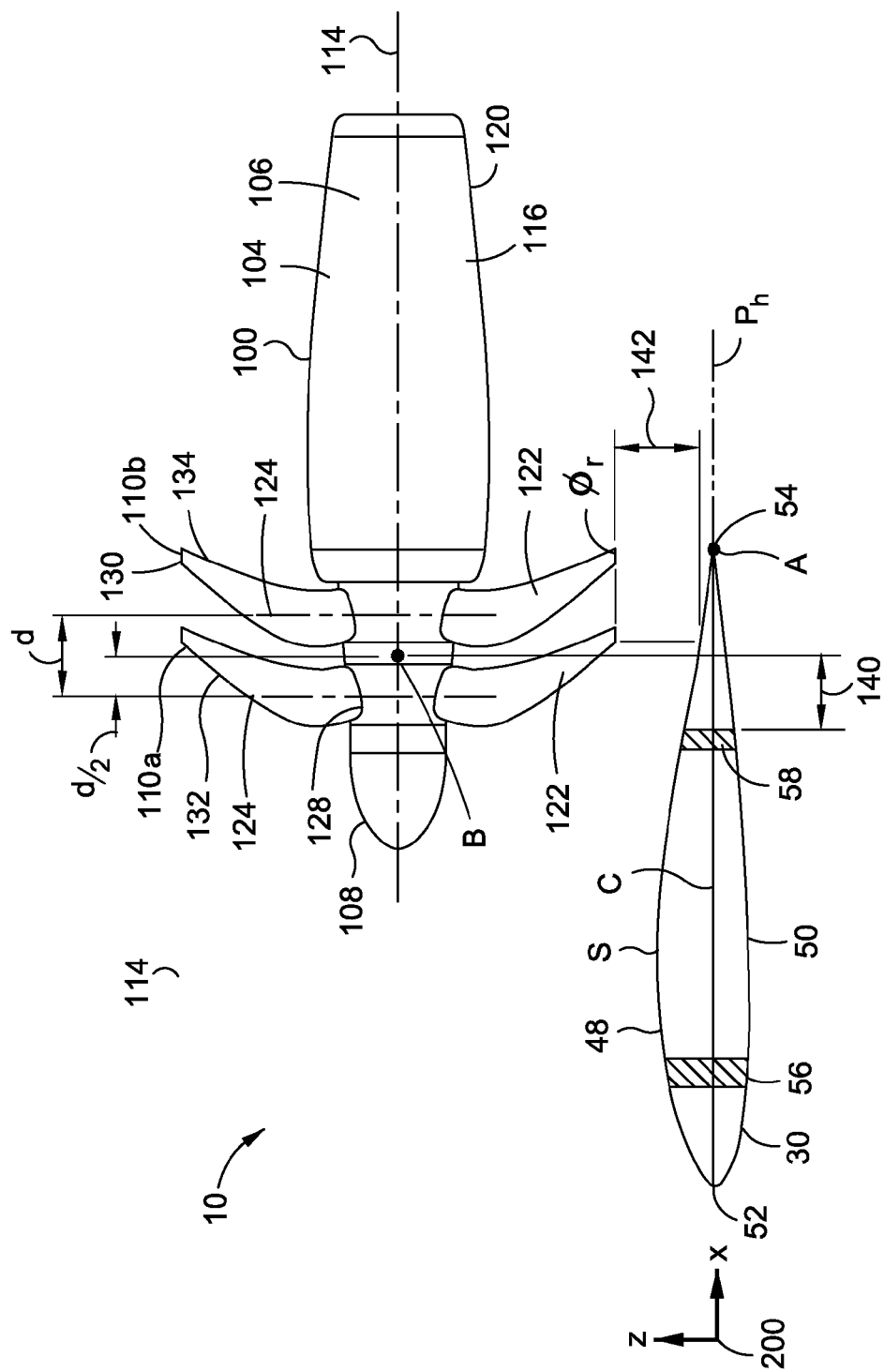
FIG. 5 is an enlarged sectional view of the wing and propulsor taken along line 5 of FIG. 1 and illustrating the location of a mid-point between the blade pitch axes of the forward and aft rotors in an embodiment of the aircraft.

In the present disclosure, the positioning of each propulsor 100 is based on the longitudinal, lateral and vertical locations of the one or more rotors 110 of the propulsor 100 relative to the wing 30 and the fuselage 12. For example, for a propulsor 100 having forward and aft rotors 110a, 110b, the longitudinal location of the forward and aft rotors 110a, 110b may be based on the location of the blade pitch axes 124 (FIG. 5) of each of the blades 122 of the forward and aft rotor 110a, 110b. As illustrated in FIG. 5, the blades 122 extend outwardly from a spinner 108 at the blade root 128. The blades 122 may pivot about the blade pitch axes 124 to change pitch in correspondence with the rotational speed of the rotor 110, the desired thrust output of the propulsor 100, and/or other parameters. The rotor 110 may include a rotor center 112 (FIG. 2) defined as the geometric center of the rotor 110.

The blade pitch axes 124 of the blades 122 of the forward rotor 110a are located at a distance d (FIG. 5) from the blade pitch axes 124 of the blades 122 of the aft rotor 110b and define a mid-point B on the rotor axis 114 at a distance d/2 midway between the blade pitch axes 124 of the forward and aft rotors 110a, 110b. In the embodiments illustrated in FIGS. 1-9, the longitudinal location of the forward and aft rotors 110a, 110b may be based on the mid-point B between the blade pitch axes 124. For a propulsor 100 having a single (not shown) rotor 110, the longitudinal location of the rotor 110 may be located at the blade pitch axes 124 of the blades 122.

Referring still to FIGS. 1-5, the lateral locations of the rotors 110 are relative to the lateral axis 204 (FIG. 2) and may be based on the lateral location of the rotor diameter $ø_r$ relative to the fuselage 12. The vertical locations of the forward and aft rotors 110a, 110b are relative to the vertical axis 206 and may be based on the vertical location of an uppermost point of the rotor diameter $ø_r$ relative to a wing tip 34 or the lowermost point of the rotor diameter $ø_r$ relative to the wing upper surface 48 or any other suitable feature of the wing 30.

As can be seen in FIG. 5, each one of the propulsors 100 may be mounted such that the mid-point B of the forward and aft rotors 110a, 110b may be located longitudinally no further forward than the rear spar 58 of the wing 30. The longitudinal distance between the rear spar 58 and the mid-point B may be defined by the distance 140. The position on the rear spar 58 from which the mid-point B may be located may be defined by a vertical plane $P_V$ best seen in FIG. 1. The vertical plane $P_V$ is coincident with the rotor axis 114 in the sense that the rotor axis 114 lies on the vertical plane $P_V$ as illustrated in FIG. 1. As shown in FIGS. 1 and 5, the vertical plane $P_V$ may define a wing section S and a wing chord line C at a location where the vertical plane $P_V$ intersects the wing 30. As is known in the art, the wing chord line C is defined as the line extending from the trailing edge 54 of the wing section to a forwardmost location of the leading edge 52 of the wing 30 section. It should also be noted that the description of the mid-point B being located longitudinally aft of the rear spar 58 is not to be construed as physically locating the rotor 110 aft of the rear spar 58 at all locations along the wingspan. Longitudinal locations of the rotor 110 as disclosed herein are locations of the rotor 110 along the longitudinal axis 202 and are not to be construed as locating the propulsor 100 without regard to the lateral and vertical locations of the rotor 110.

As shown in FIG. 5, each one of the propulsors 100 may be mounted in an embodiment wherein the mid-point B of the forward and aft rotors 110a, 110b is longitudinally located no further forward than the aftmost point of the rear spar 58 measured along the wing chord line C. The rear spar 58 may be defined as the aftmost spar of the wing 30. FIG. 5 illustrates a front spar 56 of the wing 30 which is located forward of the rear spar 58. Although FIG. 5 illustrates a front spar 56 and a rear spar 58, the wing 30 may include one or more additional spars (not shown) between the front spar 56 and the rear spar 58 and/or may include additional spars (not shown) located forward of the front spar 56. As is known in the art, the spars of an aircraft 10 wing 30 are generally the primary structural members for carrying the majority of bending loads to which the aircraft 10 wings 30 may be subjected as a result of aerodynamic lift. The wing 30 spars may also carry static and dynamic loads when the wings 30 are not aerodynamically loaded. Advantageously, in the present disclosure, the positioning of the one or more rotors 110 generally aft of the rear spar 58 mitigates the risk of a loss of structural integrity of the wings 30 including loss of the integrity of the rear spar 58 in the event of an anomaly with the rotor 110 blades 122 during operation of the propulsor 100.

Figure 3:
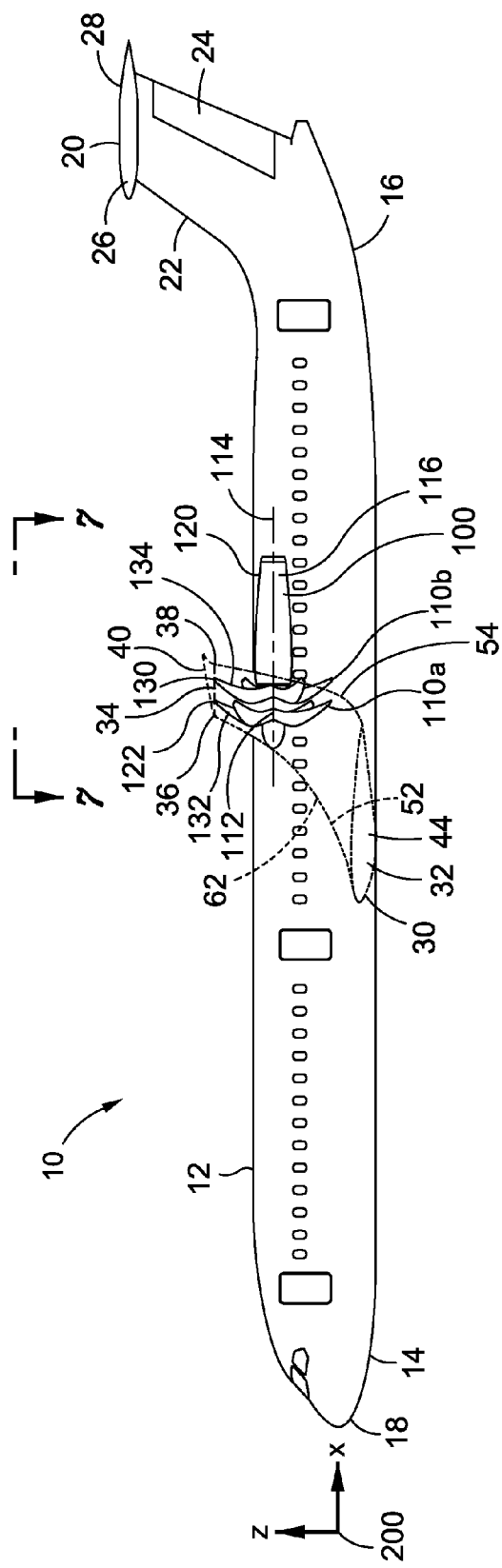
FIG. 3 is a side view of the aircraft illustrating an embodiment of the aircraft providing acoustic shielding of the rotors provided by an outboard section of the wing when deflected upwardly under the approximate 1-g wing loading.

Referring to FIGS. 3-4, the rotors 110 may also preferably be mounted such that the mid-point B of the forward and aft rotor 110a, 110b is longitudinally no further forward than the forwardmost point 36 of the wing tip 34. However, it is contemplated that the mid-point B may be located slightly forward of the forwardmost point 36 of the wing tip 34. As shown in FIG. 4, the forwardmost point 36 of the wing tip 34 may be defined as an intersection of the wing leading edge 52 with the wing tip 34 excluding wing tip devices 40 such as the raked tips illustrated in FIG. 4. By positioning the propulsor 100 such that the mid-point B is no further forward than the forwardmost point 36 of the wing tip 34, acoustic shielding of propulsor 100 noise is advantageously provided as best seen in FIG. 2.

In this regard, FIG. 2 illustrates laterally extending acoustic emission angle vectors V reflected upwardly against the deflected wing 44 under an approximate 1-g wing loading 46. The acoustic emission angle vectors V represent acoustic emissions of the propulsors 100. FIG. 2 further illustrates the increased amount of acoustic shielding resulting from the upward curvature of the deflected wing 44 relative to reduced acoustic shielding available with the undeflected wing 42 as may occur with a wing 30 of conventional metallic construction with limited flex. Furthermore, FIG. 2 illustrates a dihedral angle Γ of the wing 30 which may facilitate acoustic shielding wherein the wing 30 is oriented upwardly at an angle of between 0° and approximately 15° or more, and more preferably, at an angle of between approximately 5° and 10°. The dihedral angle Γ of the wing 30 may be measured with the wing 30 aerodynamically unloaded and at a location on the wing 30 inboard 60 of the rotor axis 114. In this regard, the dihedral angle Γ may be measured at the wing root 32 or at a junction or intersection of the wing 30 with the fuselage 12.

Referring to FIGS. 1-5, the propulsor 100 may also be mounted such that the mid-point B is located longitudinally no further aft than the aftmost point 38 (FIG. 4) of the wing tip 34. FIG. 4 illustrates a top view of the aircraft 10 showing an acoustic emission angle vector V extending laterally outwardly from the rotor 110. In FIG. 4, the acoustic emission angle vector V may generally represent noise emitted by the propulsor 100 as indicated above and may be defined as originating along the intersection of the rotor axis 114 at the mid-point B.

In FIG. 4, the acoustic emission angle vectors V extending from the mid-point B can be seen as intersecting the wing 30 at a location generally between the forwardmost point 36 and aftmost point 38 of the wing tip 34 such that during wing 30 deflection under an approximate 1-g wing loading 46 (FIG. 2), the wing 30 provides acoustic shielding against the noise produced by the rotors 110 as the acoustic emission angle vector V reflects off of the wing upper surface 48. As was earlier indicated, the aftmost point 38 of the wing tip 34 may be defined as the intersection of the wing tip 34 with the wing trailing edge 54 when the wing 30 is deflected upwardly under the approximate 1-g wing loading 46.

For a single rotor propulsor 100 configuration (not shown), the propulsor 100 may be located such that the blade pitch axes 124 (FIG. 5) of a single rotor (not shown) are longitudinally no further forward than the rear spar 58 similar to that which is illustrated for the forward and aft rotor 110a, 110b arrangement shown in FIG. 5. In addition, the blade pitch axes 124 of a single rotor is preferably no further forward than the forwardmost point 36 of the wing tip 34 when the wing 30 is deflected upwardly under an approximate 1-g wing loading 46 (FIG. 2). In addition, the blade pitch axes 124 of a single rotor (not shown) are preferably longitudinally no further aft than the aftmost point 38 of the wing tip 34 when the wing 30 is deflected upwardly under the approximate 1-g wing loading 46.

Referring to FIGS. 2 and 5, the vertical location of the rotors 110 may be such that the rotors 110 are located vertically above or at a higher elevation than the upper wing 30 surface. For the counter-rotating forward and aft rotors 110a, 110b of propulsor 100 illustrated in FIGS. 2 and 5, the propulsor 100 may be mounted such that a lowest point of the rotor diameter $\varnothing_r$ is located vertically above or at a higher elevation than the wing upper surface 48 as best seen in FIG. 5. In this regard, FIG. 5 illustrates the relative location of the rotor diameter $\varnothing_r$ at the lateral location along the wing 30 wherein the vertical plane $P_V$ intersects the wing 30 as illustrated in FIG. 1.

Although FIG. 5 illustrates the rotor diameter $\varnothing_r$ at a relatively large spacing or distance 142 above the wing upper surface 48, the propulsor 100 may be positioned such that the rotor diameter $\varnothing_r$ is located at any vertical location relative to the wing upper surface 48. For example, the rotor diameter $\varnothing_r$ may be located at a vertical distance 142 of less than one inch from the wing upper surface 48. Additionally, and referring to FIG. 2, the propulsor 100 may be vertically located such that a highest point of the rotor diameter $\varnothing_r$ of at least one of the forward and aft rotors 110a, 110b is vertically lower than the wing tip 34 when the wing 30 is deflected upwardly under an approximate 1-g wing loading 46 as shown in FIG. 2.

Referring still to FIG. 2, each one of the propulsors 100 may be mounted such that the rotor diameter $\varnothing_r$ of at least one of the forward and aft rotors 110a, 110b is laterally located at a distance 144 of no greater than approximately two rotor diameters $\varnothing_r$ from the fuselage 12. The distance 144 from the rotor diameter $\varnothing_r$ to the fuselage 12 may be measured along a vertical plane (not shown) oriented normal to the rotor axis 114 (FIG. 5) and passing through the mid-point B. In a preferred embodiment, the propulsor 100 may be laterally located such that the rotor diameter $\varnothing_r$ is laterally located a distance 144 of less than approximately one rotor diameter $\varnothing_r$ from the fuselage 12. Advantageously, by locating the forward and aft rotors 110a, 110b at a relatively short distance 144 (e.g., less than one rotor diameter $\varnothing_r$) from the fuselage 12, the fuselage 12 provides additional acoustic shielding benefits for propulsor 100 noise as described below.

Figure 6:
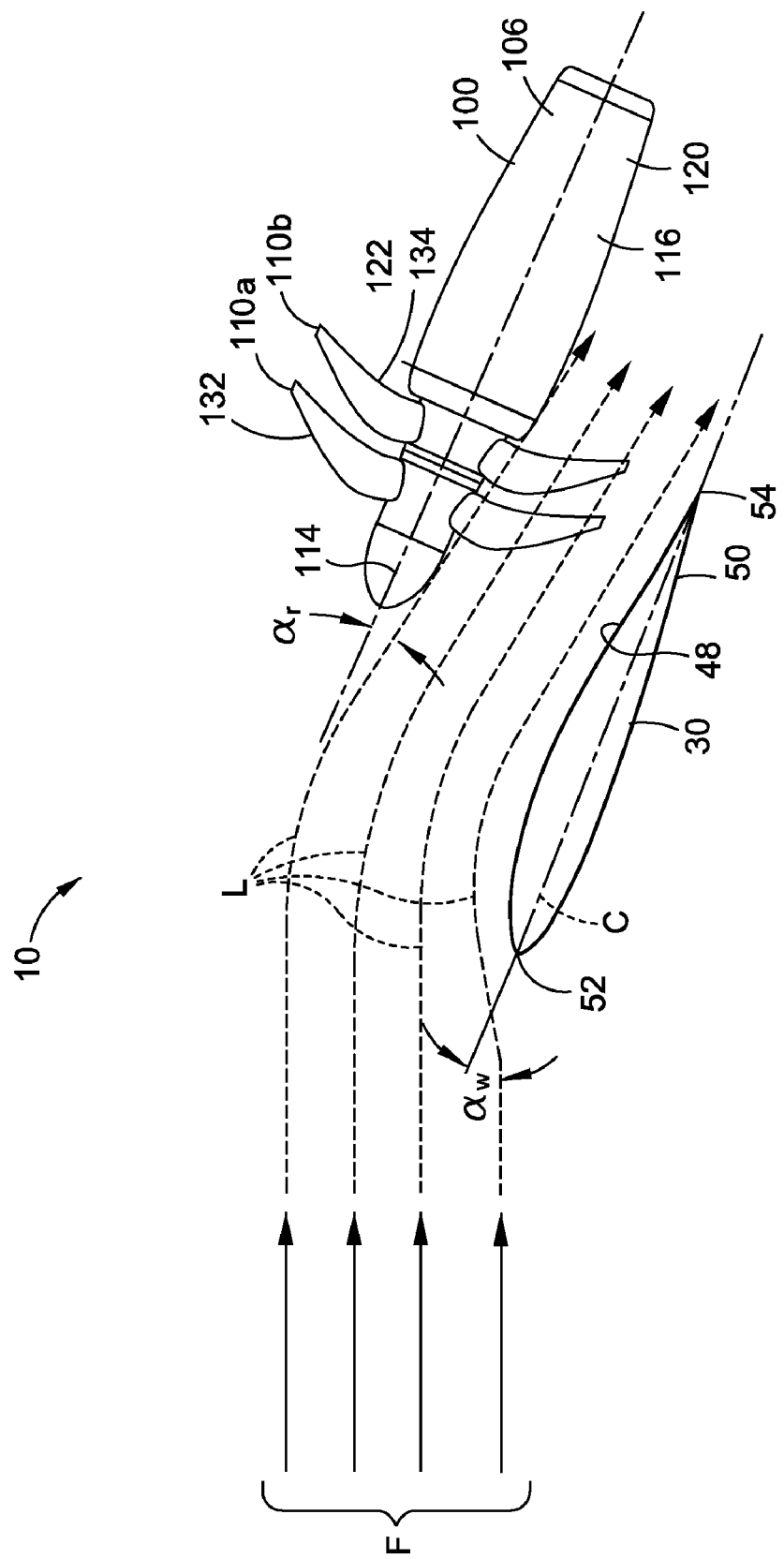
FIG. 6 is an enlarged sectional view of the wing and a propulsor and illustrating a mounting of the propulsors in an embodiment resulting in a negative local angle of attack of the rotor axis relative to a local flow over the upper wing surface when the wing is oriented at a positive angle of attack relative to a free stream flow.

Referring to FIG. 6, shown is a schematic illustration of an embodiment of the propulsor 100 positioned relative to the wing 30 wherein the propulsor 100 is oriented such that the rotor axis 114 has a negative local angle of attack $\alpha_r$ relative to a local flow L passing over the wing 30 surface. As can be seen in FIG. 6, the wing 30 is illustrated as having a positive angle of attack $\alpha_w$ relative to a free stream F flow as may occur during takeoff and climb out of the aircraft 10. Takeoff and climb out are the portions of flight when sideline noise and flyover noise are typically measured for noise certification purposes as mentioned above. Advantageously, despite the positive angle of attack $\alpha_w$ of the wing 30 relative to the free stream F flow, the aerodynamic curvature of the upper wing 30 surface may cause the local flow L to curve downwardly to provide a negative local angle of attack $\alpha_r$ of the rotor axis 114 relative to the local flow L.

Referring still to FIG. 6, the negative local angle of attack $\alpha_r$ of the rotor axis 114 relative to the local flow L reduces the noise output of the forward and aft rotors 110a, 110b relative to the noise produced if the rotor axis 114 had a positive angle of attack $\alpha_r$ relative to the local flow L. In general, up to a certain angle, each negative 1° increment in angle of attack generally results in an approximate 1 dB of attenuation of noise generated by the rotors 110. In an embodiment, the propulsor 100 may be mounted such that the rotor axis 114 has a negative local angle of attack $\alpha_r$ of between approximately 0° and −4°. However, the propulsor 100 may be oriented such that the rotor axis 114 has any suitable local angle of attack $\alpha_r$ relative to the local flow L including local angles of attack $\alpha_r$ that are of greater magnitude than −4° (i.e., −5° and above). However, the propulsor 100 may be mounted such that the rotor axis 114 has a neutral angle of attack $\alpha_r$ or a positive local angle of attack $\alpha_r$ relative to the local flow L over the wing upper surface 48.

Referring still to FIG. 6, advantageously, the positioning of the propulsors 100 such that the rotor axis 114 has a negative local angle of attack $\alpha_r$ relative to the local flow L reduces the noise level generated by the aircraft 10 such as during takeoff and climb out. In conventional open fan configurations, the blades 122 may be subjected to incoming flow that may be oriented at an angle of attack that introduces non-axisymmetric loading on the blades 122 in an unsteady state which results in an increase in sideline and flyover noise. Furthermore, conventional open fan propulsors are typically mounted forward of the wing 30 such that the aerodynamic curvature of the wing air foil introduces upwash into the blades 122 resulting in an increase in noise. However, by advantageously positioning the open fan propulsor 100 such that the forward rotor 110a is located aft of the rear spar 58 as illustrated in FIG. 5, the local flow L over the wing upper surface 48 is oriented at a negative local angle of attack $\alpha_r$ relative to the rotor axis 114 resulting in reduced noise output.

Referring briefly to FIG. 2, the propulsor 100 may be vertically located such that the rotor axis 114 (FIG. 5) is vertically lower than an uppermost point of the fuselage 12. However, as was earlier indicated, the rotor 110 may also be vertically located such that a lowermost point of the rotor diameter $\varnothing_r$ is located vertically above (i.e., at a higher elevation than) the wing upper surface 48. Furthermore, the propulsor 100 may be mounted such that the uppermost point of the rotor diameter $\varnothing_r$ is vertically no higher than the wing tip 34 as illustrated in FIG. 2. In this regard, the rotor 110 may be located at any suitable vertical location wherein the wings 30 and fuselage 12 provide acoustic shielding of propulsor 100 noise.

Figure 7:
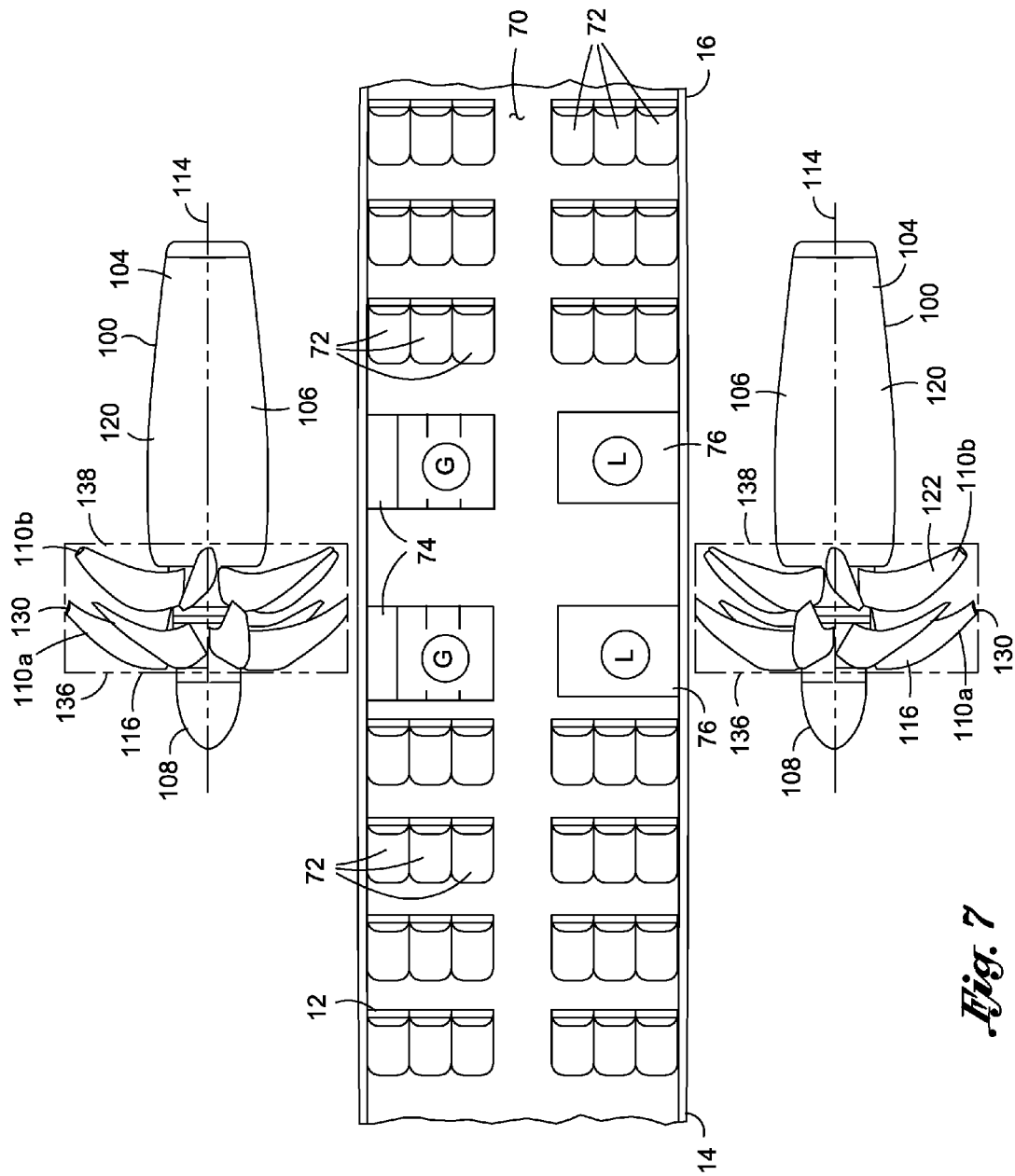
FIG. 7 is a partially cutaway sectional top view of the aircraft taken along line 7 of FIG. 3 and illustrating an embodiment of the mounting of the propulsors such that the rotors are generally longitudinally non-aligned with passenger seating within the aircraft cabin.

Referring briefly to FIG. 7, shown is a partial cutaway top view of the fuselage 12 illustrating the pair of propulsors 100 mounted on opposed sides of the fuselage 12. As can be seen, the fuselage 12 may include a cabin 70 section having passenger seating 72. The cabin 70 may further include one or more lavatories 76 and/or a galley 74 area as is common with commercial aircraft 10 (FIG. 1). In an embodiment, one or more of the propulsors 100 may be mounted such that the forward and aft rotors 110a, 110b are generally longitudinally non-aligned with the passenger seating 72. For example, as illustrated in FIG. 7, the propulsors 100 may be longitudinally aligned with the lavatories 76 and/or the galley 74 area of the cabin 70. More specifically, the propulsors 100 may be longitudinally positioned such that a rotor inlet plane 136 of the forward rotor 110 and a rotor outlet plane 138 of the aft rotor 110 are longitudinally located between the rows of passenger seating 72. However, each propulsor 100 may be longitudinally positioned at any location longitudinally along the fuselage 12 and is not limited to the longitudinal location illustrated in FIG. 7. In FIG. 7, the rotor inlet plane 136 may be defined as a forwardmost point 36 (FIG. 4) of the blade leading edge 132 (FIG. 6) of the blades 122 (FIG. 6) of the forward rotor 110. Conversely, the rotor outlet plane 138 may be defined as the aftmost point 38 (FIG. 4) of the blade trailing edge 134 (FIG. 6) of the blades 122 (FIG. 6) of the aft rotor 110.

Referring to FIGS. 13 and 14, shown are the results of an acoustic analysis of the attenuation of propulsor noise of an aircraft 10 (FIG. 1) to illustrate the acoustic shielding benefits provided by the upwardly deflected wing 44 similar to that which is illustrated in FIG. 2. For example, FIG. 13 is a plot of the sound level attenuation contours $\Delta_{s1}$ of an approximate forward quadrant relative to the aircraft 10 wing with the wing 30 in an undeflected configuration similar to the undeflected wing 42 shape shown in phantom in FIG. 2. The plot of FIG. 13 illustrates the attenuation of propulsor 100 (FIG. 1) noise along the forward direction 14' (i.e., parallel to the x axis of FIG. 1) and along the outboard direction 62' (i.e., parallel to the y axis of FIG. 1). As can be seen in FIG. 13, attenuation of noise is greatest at a location generally forward of the propulsor 100 with an area of maximum shielding $\Delta_{max}$ which provides approximately 15 dB of noise attenuation at approximately 1000 Hz. As can also be seen in FIG. 13, attenuation generally decreases along the outboard direction 62'. Attenuation $\Delta_{LE}$ in FIG. 13 also generally decreases along a direction toward the wing leading edge 52 (FIG. 4) due to acoustic shadowing provided by mounting the rotor 110 (FIG. 1) generally toward the wing trailing edge 54 (FIG. 1) or generally aftwardly thereof. In addition, attenuation $\Delta_{TE}$ in FIG. 13 can be seen as generally decreasing relatively rapidly along a direction toward the wing trailing edge 54 (FIG. 4).

FIG. 14 is a plot of the sound level attenuation contours $\Delta_{s1}$ for the same rotor 110 (FIG. 1) position represented by the plot of FIG. 13 but with the wing deflected 44' upwardly under an approximate 1-g loading such that the wing 30 has a deflected wing 44 shape similar to that which is illustrated in solid lines in FIG. 2. As can be seen, FIG. 14 illustrates a significant increase in the area of acoustic shielding due to the upward curvature of the deflected wing 44. In addition, the FIG. 14 illustrates reduction in the slope or a flattening of the lines indicted by $\Delta_{LE}$ and $\Delta_{TE}$ in FIG. 14 relative to the increased slope of the lines in FIG. 13. As indicated above, the lines $\Delta_{LE}$ and $\Delta_{TE}$ are related to the sweep of the wing leading edge 52 and wing trailing edge 54 (FIG. 4). In this regard, FIG. 14 illustrates the effect of the deflected wing 44' in reducing the slope of the sound level attenuation contours $\Delta_{s1}$ such that the attenuation contours $\Delta_{s1}$ have a generally rectangular shape in FIG. 14 relative to the generally triangular shape of the attenuation contours $\Delta_{s1}$ illustrated in FIG. 13 for the undeflected wing 42'. As can also be seen in FIG. 14, the area of maximum shielding $\Delta_{max}$ is generally increased in size relative to the area of shielding represented by the plot of FIG. 13. Furthermore, the area of shielding in FIG. 14 is increased along the outboard direction 62' and along the forward direction 14' relative to area of shielding illustrated in FIG. 13. The increased acoustic shielding results from the upward curvature of the deflected wing 44 which brings the outboard 62 section (FIG. 2) of the wing 30 nearer to the propulsor 100 (FIG. 2) and thereby increases the noise shadowing effect of the wing 30.

In FIG. 14, the increased area of noise attenuation from to the upwardly curved wing 30 (FIG. 1) is due in part to reflection of the acoustic emission angle vectors V against the deflected wing 44 (FIG. 2) into an upward direction. In this regard, the present disclosure provides an aircraft 10 (FIG. 1) arrangement wherein the propulsors 100 are positioned in such a manner to provide acoustic shielding of at least approximately 2 dB within an approximate frequency range of 200 to 500 Hz. Furthermore, the aircraft 10 arrangement disclosed herein facilitates the above-noted acoustic shielding at the noted frequencies within an emission angle $\theta_{em}$ of between approximately 30° and 95° as illustrated in FIG. 2. FIG. 2 illustrates that for the propulsor 100 located on the right-hand side of the aircraft looking aft, the 0° position of the acoustic emission angle $\theta_{em}$ is located directly below the rotor axis 114 (FIG. 5). The 90° position of the rotor 110 extends laterally outwardly toward the wing tip 34 of the right wing 30 when the rotor 110 is viewed aftwardly in FIG. 2. Although the aircraft 10 arrangement provides for shielding of acoustic emissions within emission angles $\theta_{em}$ of approximately 30° to 95°, it is contemplated that the propulsors 100 may be positioned to provide for acoustic shielding at a larger angular range or at different ranges of emission angle $\theta_{em}$ as compared to that which is illustrated in FIG. 2.

The acoustic attenuation plots of FIGS. 13-16 illustrate noise attenuation at a frequency of approximately 1000 Hz. It should be noted that the level of attenuation will generally increase for frequencies higher than the noted frequency of 1000 Hz. Likewise, the level of attenuation will generally decrease for frequencies lower than 1000 Hz. It should also be noted that for the open fan arrangements 116 illustrated in FIGS. 1-9 and the turbofan 150 arrangements illustrated in FIGS. 10-12, noise signatures emitted by the propulsors 100 range throughout the typical human audible range (i.e., approximately 20 Hz to 20000 Hz). However, the most important frequencies for noise attenuation are in the range of from approximately 500 Hz through approximately 6000 Hz.

Figure 8:
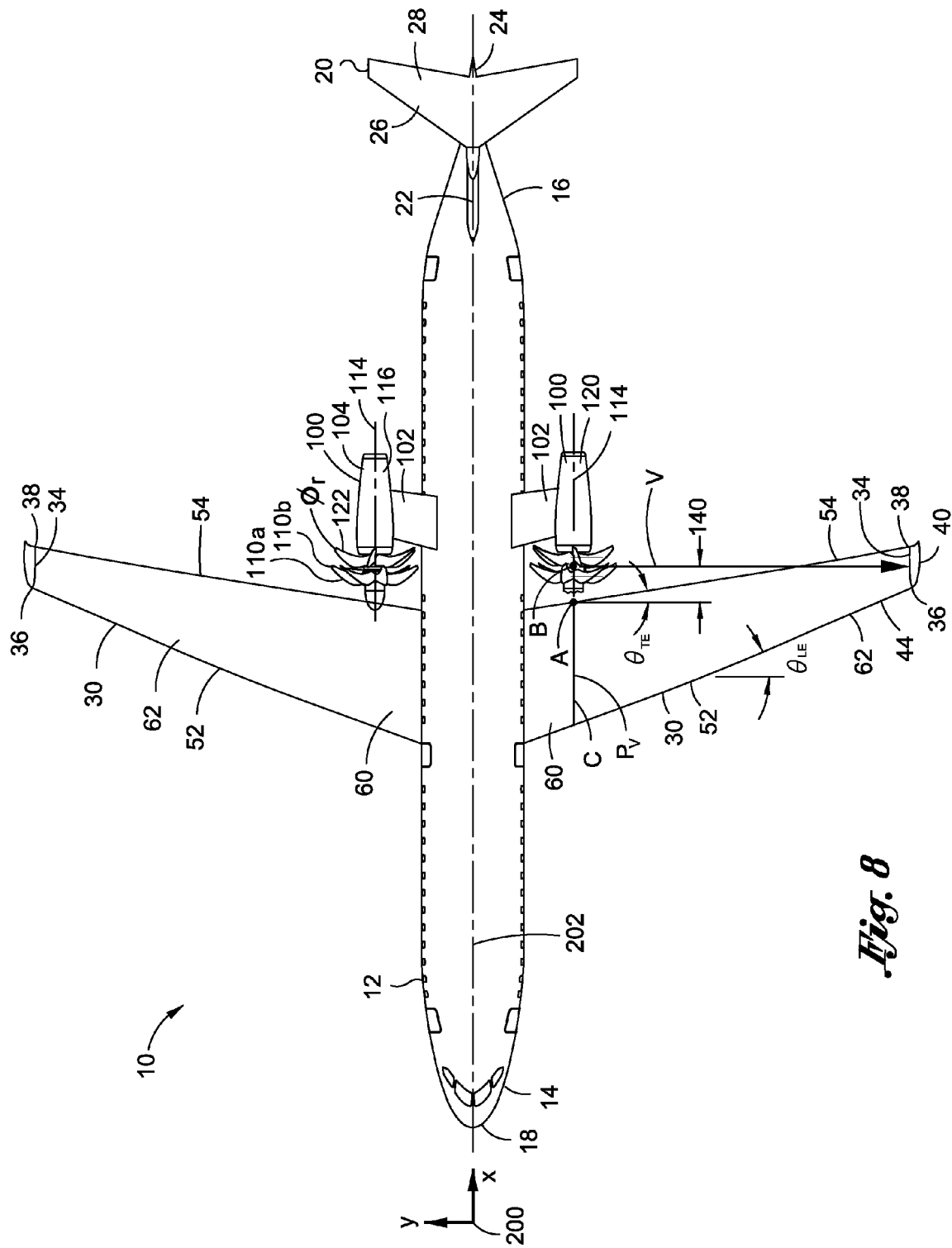
FIG. 8 is a top view of the aircraft illustrating an embodiment wherein the rotors are located longitudinally aft of the rear spar and the wings are configured such that the acoustic emissions angle vectors intersect outboard portion of the wing between a forwardmost point and an aftmost point of the wing tip.

Referring now to FIG. 8, shown is a top view of the aircraft 10 illustrating an alternative embodiment wherein the propulsors 100 are mounted such that the rotors 110 are longitudinally located aft of the wing trailing edge 54 of the wing 30. In an embodiment, the mid-point B illustrated in FIG. 8 may be longitudinally located aft of the rear spar 58 (FIG. 5). In the embodiment illustrated in FIG. 8, the wing 30 is also preferably configured to have a wing leading edge 52 sweep angle $\theta_{LE}$ such that the mid-point B is longitudinally no further forward than the wing tip 34 forwardmost point 36. Likewise, the wing trailing edge 54 sweep angle $\theta_{LE}$ is preferably configured such that the mid-point B is preferably longitudinally located no further aft than the wing tip 34 aftmost point 38.

In the embodiment of FIG. 8, the deflected wing 44 provides acoustic shielding to an extent that is similar to the shielding provided by the aircraft 10 arrangement illustrated in FIG. 4. In this regard, for the embodiment of FIG. 8, the propulsor 100 and wing 30 are preferably configured such that a highest point of the rotor diameter $\phi_r$ is vertically lower than the wing tip 34 when the wing 30 is deflected upwardly under the approximate 1-g wing loading 46 as shown in FIG. 2. Advantageously, by positioning the propulsor 100 longitudinally such that both of the forward and aft rotors 110a, 110b are longitudinally aft of the wing trailing edge 54, the risk to the structural integrity of the wing 30 in the event of a blade 122 anomaly is substantially reduced. Even further, the embodiment of FIG. 8 may provide acoustic shielding that is substantially similar to that which is provided by the arrangement illustrated in FIG. 4 wherein the forward and aft rotors 110a, 110b are located vertically above the wing upper surface 48 and the mid-point B is longitudinally aft of the rear spar 58 (FIG. 5).

Figure 16:
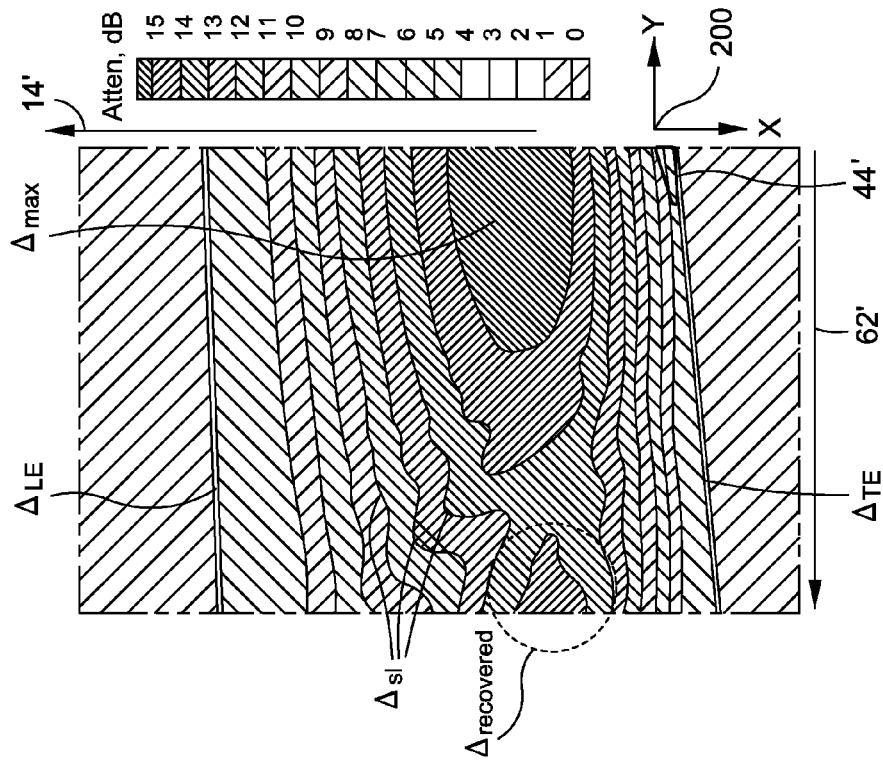
FIG. 16 is a plot of sound level attenuation contours relative to the aircraft wherein a mid-point of the rotor is located longitudinally between the rear spar and the trailing edge and the wing is configured with a sweep angle such that at outboard section of the wing provides acoustic shielding of noise emitted by the propulsor.
Figure 15:
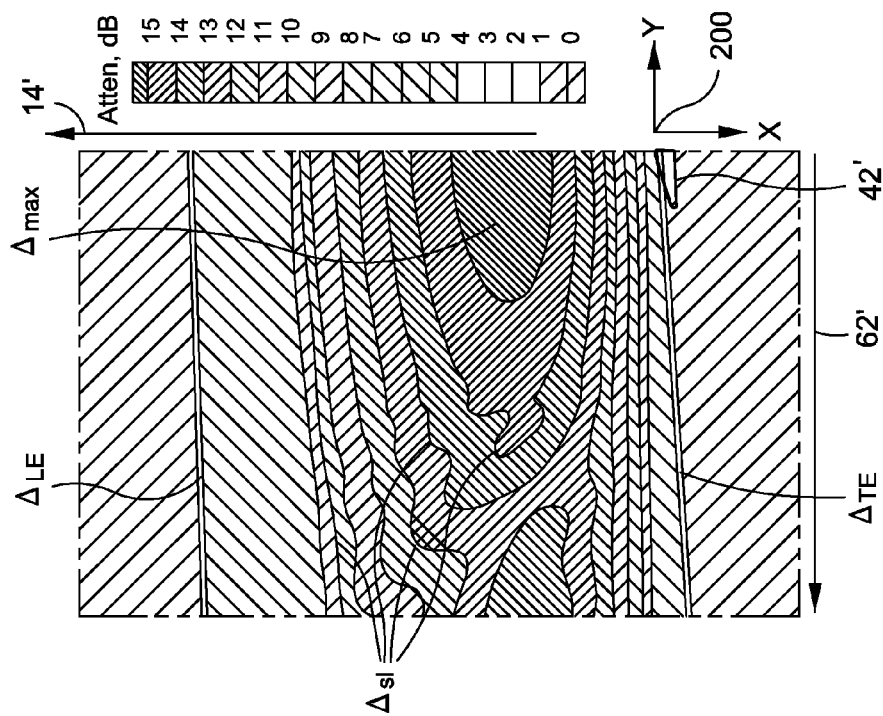
FIG. 15 is a plot of sound level attenuation contours relative to the aircraft and wherein the rotor is located longitudinally between the rear spar and the trailing edge.

Referring to FIGS. 15 and 16, shown are the results of an acoustic analysis wherein the forward and aft rotors 110a, 110b are located as illustrated in FIGS. 1-5. In the plots of FIGS. 15 and 16, the acoustic analysis is based on a deflected wing 44 shape similar to that which is illustrated in FIG. 2. FIGS. 15 and 16 illustrate the sound level attenuation contours $\Delta_{s1}$ wherein the forward and aft rotors 110a, 110b are located between the rear spar 58 (FIG. 5) and the trailing edge 54. FIG. 15 illustrates the noise attenuation with the mid-point B located longitudinally aft of the wing tip 34 aftmost point 38. In contrast, FIG. 16 illustrates a preferred embodiment wherein the wing tip 34 is shifted aft such that the mid-point B is located longitudinally between the wing tip forwardmost point 36 and aftmost point 38.

As can be seen in FIG. 15, the geometric size of the area of maximum shielding $\Delta_{max}$ in FIG. 15 is generally reduced relative to the geometric size of the area of maximum shielding $\Delta_{max}$ illustrated in FIG. 14. In contrast, FIG. 16 illustrates the acoustic performance of a preferred embodiment of FIG. 8 wherein the sweep angles $\theta_{LE}$, $\theta_{TE}$ of the wing leading and trailing edges 52, 54 result in an aftward shifting of the wing tip 34 to recover the acoustic shielding initially lost by moving the rotors 110 immediately aft of the rear spar 58 (FIG. 5). In this regard, FIG. 16 illustrates an area of recovered shielding $\Delta_{recovered}$ representing additional shielding resulting from the aftward shifting of the wing tip 34 as shown in FIG. 8. As can be seen in FIG. 16, the geometric size of the area of maximum shielding $\Delta_{max}$ is larger relative than the area of maximum shielding $\Delta_{max}$ illustrated in FIG. 15.

Referring briefly to FIG. 2, the aircraft 10 may be configured such that the fuselage 12 has a width or diameter $\phi_f$ of no less than approximately one rotor diameter $\phi_r$. The fuselage 12 width or diameter may be measured at the longitudinal location forward rotor 110a or the aft rotor 110b. In a preferred embodiment, the aircraft 10 may be configured such that the forward and aft rotors 110a, 110b are located laterally such that the rotor diameter $\phi_r$ has a lateral clearance or distance 144 (FIG. 2) of at least approximately 24 inches with the fuselage 12. However, as was indicated earlier, the forward and aft rotors 110a, 110b may be laterally located at any position relative to the fuselage 12.

Referring briefly to FIG. 4, it should also be noted that the aircraft 10 arrangement disclosed herein includes acoustic shielding advantages as a result of the relatively close proximity of the rotors 110 to the fuselage 12. Advantageously, the fuselage 12 provides acoustic shielding for each one of the forward and aft rotors 110a, 110b against propulsor 100 noise perceived or measured on an opposite side of the fuselage 12 from the given propulsor 100. In this regard, the combination of the fuselage 12 and the upward curvature of the deflected wing 44 provides acoustic shielding to an extent that noise perceived in a lateral direction relative to each propulsor 100 is a fraction of the noise produced by each propulsor 100.

Furthermore, the fuselage 12 provides acoustic shielding of propulsor 100 (FIG. 2) noise in addition to noise produced by the rotors 110. For example, the fuselage 12 provides acoustic shielding of jet or exhaust (FIG. 10) noise produced by the propulsor 100 and which is generally radiated in an aftward direction. Furthermore, the fuselage 12 provides acoustic shielding of turbine noise that may be generated internally within the propulsor 100 as well as combustor noise that may be generated internally. In an embodiment, the fuselage 12 may provide acoustic shielding of jet noise, turbine noise and combustor noise for distances of up to approximately ten times a diameter of an exhaust nozzle, (not shown) of the propulsors 100. The aircraft 10 (FIG. 1) arrangement disclosed herein may provide a further advantage in that the fuselage 12 physically separates the propulsors 100 from one another to avoid damage to both propulsors 100 should an anomaly occur with one of the propulsors 100.

Referring briefly to FIG. 9, shown is an alternative embodiment of the aircraft 10 wherein the propulsors 100 are configured in a pusher arrangement 118. In the pusher arrangement 118 illustrated in FIG. 9, the forward and aft rotors 110a, 110b are located aft of the engine core 106 (e.g., turbine) contained within the core case 104 of the propulsor 100. The forward and aft rotors 110a, 110b may be located longitudinally, laterally and/or vertically in a manner similar to the tractor arrangement 120 illustrated in FIGS. 1-8 and described above.

Referring to FIGS. 10 and 11, shown is a further alternative arrangement of the aircraft 10 wherein each one of the propulsors 100 may be configured as a turbofan 150 such as a low bypass or high bypass turbofan 150. As can be seen in FIGS. 10 and 11, the turbofan 150 may include a nacelle 152 for housing a fan which may have a plurality of fan blades. The nacelle 152 may have an inlet 154 defining an inlet axis 156. In addition, the inlet 154 may include a hilite 158 which may be defined as a bounded planar area located at a forwardmost location of a generally rounded annularly shaped leading edge of the inlet 154. The hilite 158 may lie on a hilite plane 160 and may have a hilite diameter $\phi_h$ (FIG. 12) which may have a geometric center 162 as shown in FIG. 12. The turbofan 150 may be longitudinally, laterally and vertically located based upon the hilite 158, the hilite plane 160 and the geometric center 162 of the hilite 158 in a manner similar to the location of the forward and aft rotors 110a, 110b by means of the mid-point B located between the blade pitch axes 124 of the of the forward and aft rotors 110a, 110b as illustrated in FIGS. 4-5.

For example, as shown in FIG. 10, the turbofan 150 may be mounted such that the hilite plane 160 is located longitudinally between the rear spar 58 and the wing trailing edge 54 when measured along the wing chord line C defined by the vertical plane $P_V$ (FIG. 1). As illustrated in FIG. 1 and described above, the vertical plane $P_V$ is a plane that may be coincident with the rotor axis 114 (FIG. 5) as shown in FIG. 1. Furthermore, the hilite plane 160 may preferably be longitudinally located between the wing tip 34 forwardmost point 36 and the wing tip 34 aftmost point 38 as best seen in FIG. 10.

Referring briefly to FIG. 11, shown is the aircraft 10 in an alternative embodiment wherein the turbofan 150 is mounted adjacent a leading edge 52 of the wing 30. More specifically, the turbofan 150 may be mounted such that a secondary flow exit 164 at the aftmost point of the nacelle 152 is no further forward than the leading edge 52 of the wing 30 and may be located a relatively short distance 140 aft of the leading edge 52. In such a longitudinal location, noise generated at the second flow exit 164 and primary flow exhaust 166 may be attenuated due to acoustic shielding provided by the deflected wing 44. Such acoustic shielding may be enhanced when the wing 30 is under the approximate 1-g wing loading 46 manner similar to that which is shown in FIG. 2 and described above for the open fan arrangement 116 (FIG. 2). For the turbofan arrangements illustrated in FIGS. 10-11, the turbofans 150 may be located vertically as shown in FIG. 12 where in the lowest point of the nacelle 152 is located vertically above the wing upper surface 48.

Referring briefly to FIG. 12, the turbofan 150 may be mounted vertically such that the nacelle 152 is located vertically above the wing upper surface 48 similar to that which is described above with regard to the open fan arrangement 116 illustrated in FIG. 5. Furthermore, the turbofan 150 arrangements illustrated in FIGS. 10-11 may be mounted such that the geometric center 162 of the hilite 158 is located vertically below the wing tip 34 when the wing 30 is deflected upwardly under an approximate 1-g loading to maximize acoustic shielding in a lateral direction. In addition, the turbofan 150 may be mounted such that the minimum distance 144 between the nacelle 152 and the fuselage 12 at the maximum width of the nacelle 152 is less than the approximate combined length of two of the nacelle 152 diameters. The turbofan 150 may be configured in any suitable turbofan 150 arrangement including, but not limited to, a geared turbofan and a ducted turbofan.

Figure 17:
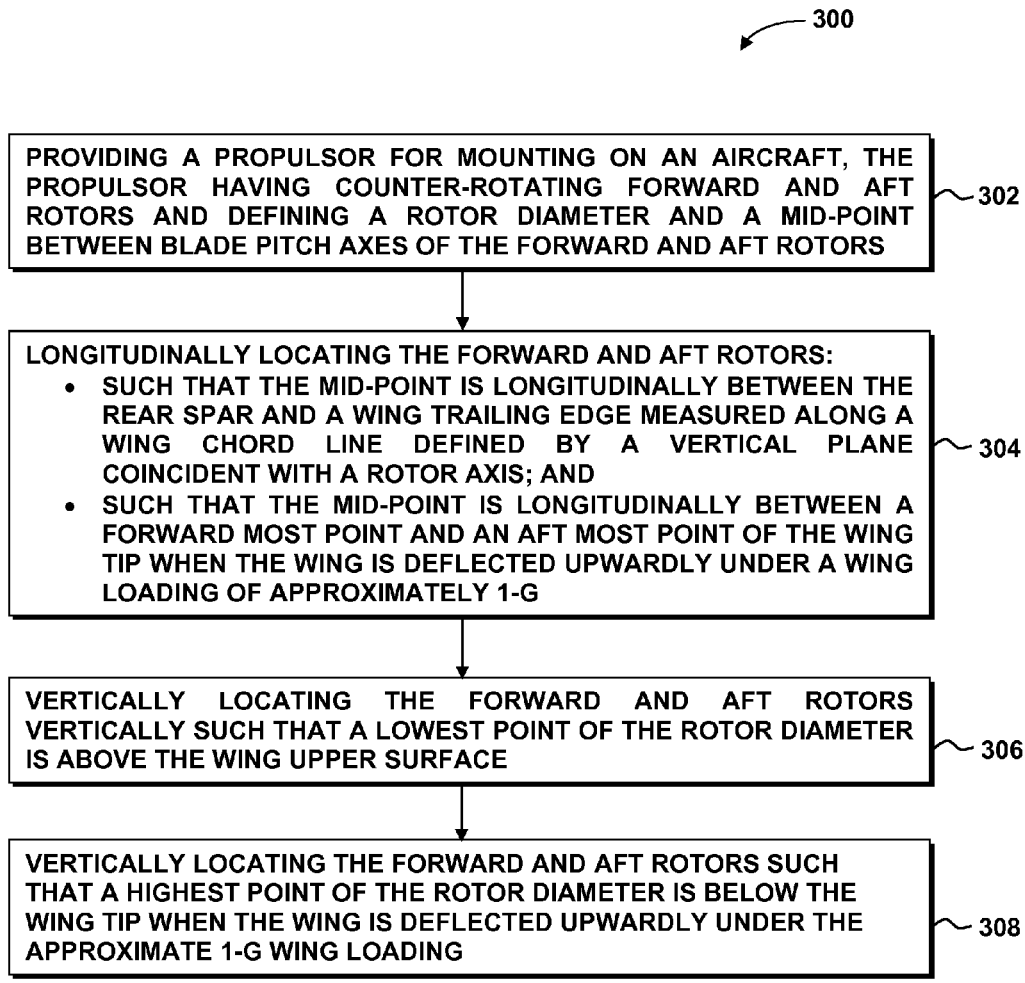
FIG. 17 is a flow chart illustrating one or more operations that may be implemented in a methodology of attenuating noise emitted by an aircraft.

Referring to FIG. 17 with additional reference to FIGS. 1-11, shown is a flow chart illustrating one or more operations that may be implemented in a methodology 300 of attenuating acoustic noise produced by a propulsor 100 of an aircraft 10 as shown in FIG. 1-11. Step 302 of the methodology illustrated in FIG. 17 may include providing the propulsor 100 for mounting on an aircraft 10 (FIG. 1). As indicated above, the propulsor 100 (FIGS. 1-11) may include one or more rotors 110 (FIGS. 1-11), each including a plurality of blades 122 (FIG. 1-9). Each propulsor 100 may define a rotor diameter $ø_r$ (FIG. 2) and may include a rotor axis 114 (FIG. 1) about which the rotors 110 may rotate. For example, the propulsor 100 may include counter-rotating forward and aft rotors 110a, 110b as illustrated in FIG. 1. A mid-point B (FIG. 4) may be defined as lying on the rotor axis and 114 at a distance d/2 (FIG. 5) midway between the blade pitch axes 124 of the forward and aft rotor 110a, 110b.

Step 304 of FIG. 17 may include mounting the propulsor 100 (FIGS. 1-11) on at least one of the wings 30 and/or fuselage 12 such as by means of one or more pylons 102 (FIG. 4) and locating the rotor 110 longitudinally such that the mid-point B is longitudinally no further forward than the rear spar 58 (FIG. 5) of the aircraft 10 wing 30 and no further aft than the trailing edge 54 as measured along a wing chord line C defined by a vertical plane $P_V$ (FIG. 1) that is coincident with the rotor axis 114 (FIG. 5). Furthermore, Step 304 of the methodology may comprise longitudinally locating the rotors 110 such that the mid-point B is longitudinally between a forwardmost point 36 and an aftmost point 38 of the wing tip 34 when the wing 30 is deflected upwardly under an approximate 1-g wing loading 46 as illustrated in FIG. 4.

Step 306 of the methodology illustrated in FIG. 17 may comprise locating the forward and aft rotors 110a, 110b vertically such that a lowest point of the rotor diameter $ø_r$ is vertically above the wing upper surface 48 similar to that which is illustrated in FIG. 4. Step 308 of the methodology may comprise vertically locating a highest point of the rotor diameter $ø_r$ (FIG. 2) to be vertically below the wing tip 34 when the wing 30 is deflected upwardly under the approximate 1-g wing loading 46 as described above with regard to FIG. 2. For example, FIG. 2 illustrates the aircraft 10 arrangement wherein the highest point of the rotor diameter $ø_r$ is vertically at the same height as the wing tip 34. However, the rotor 110 may be vertically located such that a highest point of the rotor diameter $ø_r$ is lower than the height of the wing tip 34. The rotor 110 may optionally be vertically located such that the rotor axis 114 (FIG. 5) is vertically located at approximately the same height as a top surface or crown of the fuselage 12.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An arrangement for an aircraft, comprising:
  a fuselage;
  a wing having a wing upper surface, a rear spar and a wing trailing edge; and
  a propulsor including at least one rotor having a rotor diameter and a rotor axis, the propulsor being mounted such that the at least one rotor is located according to the following:
    longitudinally between the rear spar and the wing trailing edge measured along a wing chord line defined by a vertical plane coincident with the rotor axis; and
    vertically such that a lowest point of the rotor diameter is above the wing upper surface.

2. The arrangement of claim 1 wherein the rotor is located:
  laterally such that the shortest distance from the rotor diameter to the fuselage is approximately no greater than two rotor diameters.

3. The arrangement of claim 1 wherein the wing includes a wing tip, the wing being configured such that the rotor is located:
  longitudinally between a forward most point and an aftmost point of the wing tip when the wing is deflected upwardly under a wing loading of approximately 1-g.

4. The arrangement of claim 3 wherein:
  the wing trailing edge has a sweep angle in the range of approximately −5 to −10 degrees.

5. The arrangement of claim 3 wherein the propulsor being mounted such that the rotor is located according to the following:
  longitudinally aft of the trailing edge;
  vertically such that a lowest point of the rotor diameter is no lower than a horizontal plane passing through a terminus of the wing chord line at the trailing edge.

6. The arrangement of claim 1 wherein:
the wing has a dihedral angle of up to approximately 10 degrees.

7. The arrangement of claim 1 wherein the wing includes a wing tip, the rotor being located:
vertically such that a highest point of the rotor diameter is vertically lower than the wing tip when the wing is deflected upwardly under a wing loading of approximately 1-g.

8. The arrangement of claim 1 wherein: the rotor axis has a local angle of attack no greater than 0 degrees relative to a local flow over the wing upper surface.

9. The arrangement of claim 8 wherein:
the local angle of attack is between approximately 0 degrees and −4 degrees.

10. The arrangement of claim 1 wherein the fuselage has a cabin including passenger seating; the rotor being located:
longitudinally such that the rotor is generally non-aligned with the passenger seating.

11. The arrangement of claim 1 wherein:
the propulsor is configured as a turbofan having a nacelle and an inlet having an inlet axis and a hilite defining a hilite plane;
the turbofan being mounted according to the following:
longitudinally such that the hilite plane is between the rear spar and the wing trailing edge measured along a wing chord line defined by a vertical plane coincident with the inlet axis; and
vertically such that a lowest point of the hilite is above the wing upper surface.

12. The arrangement of claim 11 wherein the nacelle terminates at a secondary flow exit, the turbofan being mounted according to the following:
longitudinally such that the secondary flow exit is aft of the wing leading edge; and
vertically such that a lowest point of the nacelle is above the wing upper surface.

13. An arrangement for acoustic shielding of an open fan aircraft, comprising:
a generally tubular fuselage;
a wing having a wing tip, a wing upper surface, a rear spar and a wing trailing edge; and
a propulsor having counter-rotating forward and aft rotors defining a rotor diameter and a rotor axis and including a plurality of rotor blades each having a blade pitch axis, the blade pitch axes of the forward and aft rotors defining a mid-point therebetween, the propulsor being mounted such that the forward and aft rotors are located according to the following:
longitudinally such that the mid-point is between the rear spar and the wing trailing edge measured along a wing chord line defined by a vertical plane coincident with the rotor axis;
longitudinally such that the mid-point is between a forward most point and an aftmost point of the wing tip when the wing is deflected upwardly under a wing loading of approximately 1-g; and
vertically such that a lowest point of the rotor diameter is vertically above the wing upper surface.

14. A method of attenuating noise produced by a propulsor of an aircraft, the propulsor including at least one rotor having a rotor diameter and a rotor axis, the aircraft including a wing having a wing upper surface, a rear spar and a wing trailing edge, comprising the steps of:
locating the rotor longitudinally between the rear spar and the wing trailing edge measured along a wing chord line defined by a vertical plane coincident with the rotor axis; and
locating the rotor vertically such that a lowest point of the rotor diameter is above the wing upper surface.

15. The method of claim 14 wherein the step of locating the propulsor longitudinally further comprises:
locating the rotor longitudinally such that the rotor is between a forward most point and an aftmost point of the wing tip when the wing is deflected upwardly under a wing loading of approximately 1-g.

16. The method of claim 14 further comprising the step of:
providing the wing with a dihedral angle of up to approximately 10 degrees.

17. The method of claim 14 wherein the wing includes a wing tip, the step of locating the propulsor vertically further comprises:
locating the rotor diameter vertically below the wing tip when the wing is deflected upwardly under a wing loading of approximately 1-g.

18. The method of claim 14 wherein the steps of locating the propulsor comprises:
locating the rotor longitudinally aft of the trailing edge; and
locating the rotor vertically such that a lowest point of the rotor diameter is no lower than a horizontal plane passing through a terminus of the wing chord line at the trailing edge.

19. The method of claim 14 further comprising the step of:
orienting the propulsor such that the rotor axis has a negative local angle of attack relative to a local flow over the wing upper surface.

20. The method of claim 14 wherein the propulsor includes forward and aft rotors including a plurality of rotor blades each having a blade pitch axis, the blade pitch axes of the forward and aft rotors defining a mid-point therebetween, the step of locating the rotor longitudinally comprising:
locating the mid-point between a forward most point and an aftmost point of the wing tip when the wing is deflected upwardly under a wing loading of approximately 1-g.

21. A method of attenuating noise produced by a propulsor of an aircraft, the propulsor having counter-rotating forward and aft rotors defining a rotor diameter and a rotor axis and including a plurality of rotor blades each having a blade pitch axis, the blade pitch axes of the forward and aft rotors defining a mid-point therebetween, the aircraft including a wing having a wing tip, a rear spar and a wing trailing edge, the method comprising the steps of:
locating the mid-point longitudinally between the rear spar and the wing trailing edge measured along a wing chord line defined by a vertical plane coincident with the rotor axis;
locating the mid-point longitudinally between a forward most point and an aftmost point of the wing tip when the wing is deflected upwardly under a wing loading of approximately 1-g;
locating the forward and aft rotors vertically such that a lowest point of the rotor diameter is above the wing upper surface; and
locating the forward and aft rotors vertically such that a highest point of the rotor diameter is below the wing tip when the wing is deflected upwardly under the approximate 1-g wing loading.

* * * * *